United States Patent
Ishikawa et al.

(10) Patent No.: US 8,949,511 B2
(45) Date of Patent: Feb. 3, 2015

(54) NONVOLATILE SEMICONDUCTOR STORAGE SYSTEM

(75) Inventors: Atsushi Ishikawa, Minami-Ashigara (JP); Koji Sonoda, Chigasaki (JP); Go Uehara, Odawara (JP); Junji Ogawa, Sagamihara (JP); Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 13/379,223

(22) PCT Filed: Sep. 30, 2011

(86) PCT No.: PCT/JP2011/072653
§ 371 (c)(1),
(2), (4) Date: Dec. 19, 2011

(87) PCT Pub. No.: WO2013/046463
PCT Pub. Date: Apr. 4, 2013

(65) Prior Publication Data
US 2013/0086305 A1   Apr. 4, 2013

(51) Int. Cl.
*G06F 12/02* (2006.01)
*G06F 13/16* (2006.01)
*G06F 3/06* (2006.01)

(52) U.S. Cl.
CPC .............. *G06F 13/16* (2013.01); *G06F 3/0626* (2013.01); *G06F 3/0658* (2013.01); *G06F 3/0685* (2013.01); *G06F 3/0635* (2013.01)
USPC ........................................................ 711/103

(58) Field of Classification Search
CPC .......................... G06F 12/0246; G06F 3/0601
See application file for complete search history.

(56) References Cited

U.S. PATENT DOCUMENTS

| | | | |
|---|---|---|---|
| 2008/0052443 A1* | 2/2008 | Cassiday et al. | 710/316 |
| 2008/0177940 A1* | 7/2008 | Risse | 711/105 |
| 2009/0049266 A1 | 2/2009 | Kuhne | |
| 2009/0319716 A1 | 12/2009 | Nagadomi | |

(Continued)

FOREIGN PATENT DOCUMENTS

| | | |
|---|---|---|
| JP | 2005-258874 | 9/2005 |
| JP | 2008-523528 | 7/2008 |

(Continued)

OTHER PUBLICATIONS

Multiplexer, Wikipedia Jul. 2011.*
International Search Report dated Jan. 10, 2012 for PCT/JP2011/072653.

*Primary Examiner* — Duc Doan
(74) *Attorney, Agent, or Firm* — Foley & Lardner LLP

(57) ABSTRACT

A nonvolatile semiconductor storage system has multiple nonvolatile semiconductor storage media, a control circuit having a media interface group (one or more interface devices) coupled to the multiple nonvolatile semiconductor storage media, and multiple switches. The media interface group and the multiple switches are coupled via data buses, and each switch and each of two or more nonvolatile chips are coupled via a data bus. The switch is configured so as to switch a coupling between a data bus coupled to the media interface group and a data bus coupled to any of multiple nonvolatile chips that are coupled to this switch. The control circuit partitions write-target data into multiple data elements, switches a coupling by controlling the multiple switches, and distributively sends the multiple data elements to multiple nonvolatile chips.

9 Claims, 17 Drawing Sheets

(56) References Cited

U.S. PATENT DOCUMENTS

| | | |
|---|---|---|
| 2010/0049905 A1* | 2/2010 | Ouchi .......................... 711/103 |
| 2010/0318719 A1* | 12/2010 | Keays et al. ................. 711/103 |
| 2010/0332734 A1* | 12/2010 | Chen et al. ................... 711/103 |
| 2011/0145475 A1* | 6/2011 | Eleftheriou et al. .......... 711/103 |
| 2011/0213921 A1* | 9/2011 | Yu et al. ....................... 711/103 |
| 2011/0238885 A1* | 9/2011 | Kitahara et al. .............. 711/103 |

FOREIGN PATENT DOCUMENTS

| | | |
|---|---|---|
| JP | 2010-003161 | 1/2010 |
| JP | 2010-049586 | 3/2010 |
| WO | WO-2006/058892 A2 | 6/2006 |

* cited by examiner

FIG. 17

| Block number | Page number in block | Attribute | Address | T601 |
|---|---|---|---|---|
| 00 | 000 | Valid | 0x00 | |
| | 001 | Free | None | |
| | 002 | Free | None | |
| | 003 | Free | None | |
| ⋮ | | | | |
| 10 | 100 | Valid | 0x08 | |
| | 101 | Free | None | |
| | 102 | Free | None | |
| | 103 | Free | None | |
| ⋮ | | | | |

FIG. 19

| CE signal line number | FM chip number | Block number | Number of block erases | Total |
|---|---|---|---|---|
| 0 | 0 | 0 | 30 | 500 |
| | | 1 | 40 | |
| | | ... | ... | |
| | 1 | ... | ... | |
| | ... | ... | ... | |
| 1 | ... | ... | ... | ... |
| ... | ... | ... | ... | ... |

1900

NONVOLATILE SEMICONDUCTOR STORAGE SYSTEM

TECHNICAL FIELD

The present invention relates to storage system having multiple nonvolatile semiconductor storage media.

BACKGROUND ART

A storage system generally provides a logical volume, which has been created based on a RAID (Redundant Array of Independent Disks) group comprising multiple storage devices, to a higher-level apparatus (for example, a host computer). In recent years, a nonvolatile semiconductor storage device comprising multiple nonvolatile chips, has been employed either in addition to or instead of a HDD (Hard Disk Drive) as the storage device. For example, a flash memory, which comprises multiple flash memory chips (hereinafter, FM chips), is employed as the nonvolatile semiconductor memory device (for example, Patent Literature 1).

CITATION LIST

Patent Literature

[PTL 1]
Japanese Patent Application Laid-open No. 2010-3161

SUMMARY OF INVENTION

Technical Problem

Increased storage capacity is being demanded in nonvolatile semiconductor storage devices as well. In order to increase storage capacity, it is necessary to increase the number of installed nonvolatile chips, but when installing more numerous nonvolatile chips, pins for coupling a bus for sending various types of signals to multiple nonvolatile chips must be provided in a circuit (hereinafter, a control circuit, for example, an ASIC (Application Specific Integrated Circuit)) comprising an interface device coupled to a nonvolatile chip.

For this reason, when increasing the storage capacity of a nonvolatile semiconductor storage device, the size of the control circuit becomes larger. Alternatively, when the size of the control circuit is made smaller, the number of nonvolatile chips capable of being coupled decreases, and it is impossible to increase the storage capacity. Furthermore, when large numbers of nonvolatile chips are coupled, it is impossible to transfer data efficiently.

An object of the present invention is to provide technology that makes it possible to increase the number of installed nonvolatile chips while holding down the size of the control circuit, and to enable data transfer to be performed efficiently.

Solution to Problem

A nonvolatile semiconductor storage system comprises (a) multiple nonvolatile semiconductor storage media, (b) a control circuit having a media interface group (one or more interface devices) coupled to the multiple nonvolatile semiconductor storage media, and (c) multiple switches. The media interface group and multiple switches are coupled via data buses, and each switch is coupled to each of two or more nonvolatile chips via a data bus. The switch is configured so as to switch a coupling between the data bus coupled to the media interface group and the data bus coupled to any of the multiple nonvolatile chips that is/are coupled to this switch. The control circuit partitions write-target data into multiple data elements, switches couplings by controlling multiple switches, and distributively sends multiple data elements to multiple nonvolatile chips.

The nonvolatile semiconductor storage system may be a storage medium group (for example, a flash memory PKG 10, which will be described further below) comprising the above-mentioned elements (a), (b) and (c), may be a storage apparatus (for example, a flash memory device 400, which will be described further below) comprising multiple such storage medium groups, or may be a system (for example, a storage system 1, which will be described further below) comprising multiple such storage apparatuses and a controller coupled to these storage apparatuses.

The media interface group comprises multiple media interfaces, a media interface may exists for each N number of nonvolatile semiconductor storage media (where N is an integer of equal to or larger than 1). The multiple nonvolatile chips constituting a single nonvolatile semiconductor storage medium, for example, may exist in a single DIMM. The DIMM may comprise one or more switches coupled to these multiple nonvolatile chips.

BRIEF DESCRIPTION OF DRAWINGS

FIG. 17 shows an example of the configuration of logical-physical translation information related to the embodiment.

FIG. 19 shows an example of the configuration of erase management information related to the embodiment.

DESCRIPTION OF THE EMBODIMENT

Figure 1:
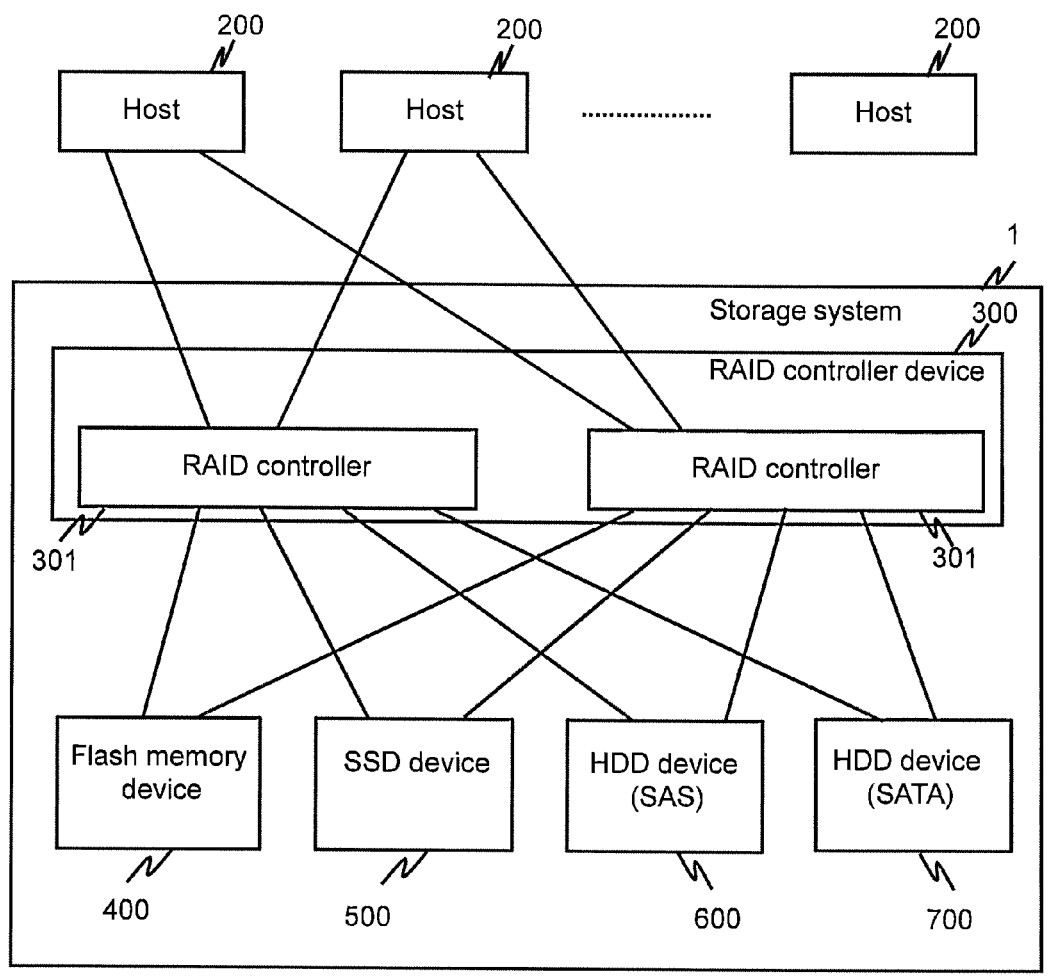
FIG. 1 shows an example of the configuration of a computer system related to an embodiment.

An example will be explained below by referring to the drawings.

Furthermore, in the following explanation, identification information comprising a number is used to identify an element (for example, a page, a flash memory chip (FM chip), and a switch (SW)), but information that does not comprise a number may be used as the identification information.

Also, in the following explanation, when giving an explanation that distinguishes between elements of the same type, a combination of the element name and the identification information may be used in place of a combination of the element name and a reference sign. For example, a switch with the identification information (identification number) "0" may be written as "switch #0".

In the following explanation, an interface device may be abbreviated as "I/F".

Also, in the following explanation, it is supposed that the nonvolatile semiconductor storage medium is a flash memory (FM). It is also supposed that this flash memory is the type of flash memory in which an erase is performed in units of blocks and an access is performed in units of pages, and typically is a NAND-type flash memory. However, the flash memory may be another type of flash memory (for example, a NOR type) instead of a NAND type. Also, another type of nonvolatile semiconductor storage medium, for example, a phase-change memory, may be used in place of the flash memory.

In the following explanation, the nonvolatile semiconductor storage medium is a NAND-type flash memory as was explained above. For this reason, the terms page and block will be used. Also, in a case where a certain logical area (called "target logical area" in this paragraph) is a write destination, and, in addition, a page (called "first page" in this paragraph) is already allocated to the target logical area and data is stored in the first page, a free page (called "second page" in this paragraph) is allocated to the target logical area in place of the first page, and the data is written to this second page. The data written to the second page is the latest data with respect to the target logical area, and the data stored in the first page is the old data with respect to the target logical area. Hereinbelow, the latest data may be called "valid data" and the old data may be called "invalid data" with regard to each logical area. Furthermore, the page storing the valid data may be called a "valid page", and the page storing the invalid data may be called an "invalid page".

Now then, an overview of this embodiment will be explained first.

Figure 2:
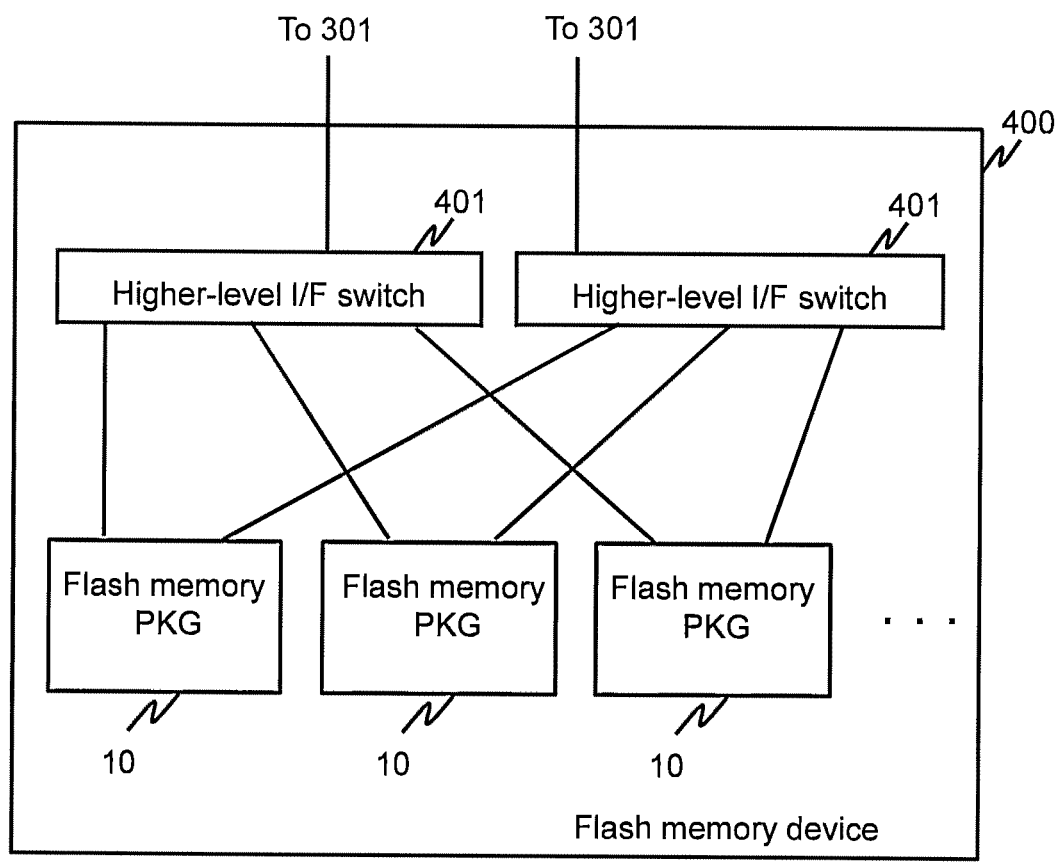
FIG. 2 shows an example of the configuration of a flash memory device related to the embodiment.
Figure 3:
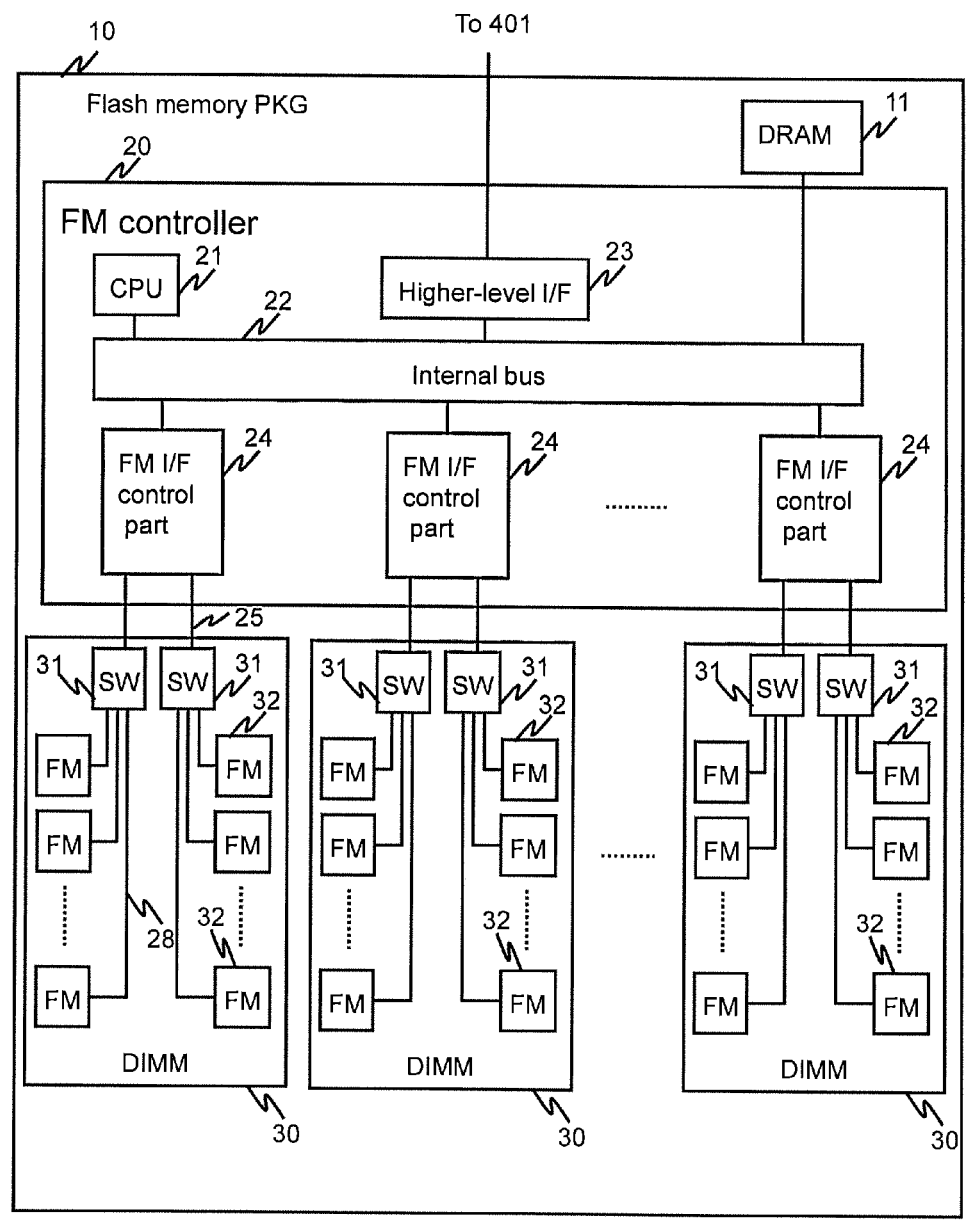
FIG. 3 shows an example of the configuration of a flash memory package related to the embodiment.

A flash memory device 400, for example, comprises one or more flash memory packages (flash memory PKG) 10 as shown in FIG. 2. The flash memory PKG 10 comprises multiple flash memory chips (FM chip) 32 as shown in FIG. 3.

Figure 4:
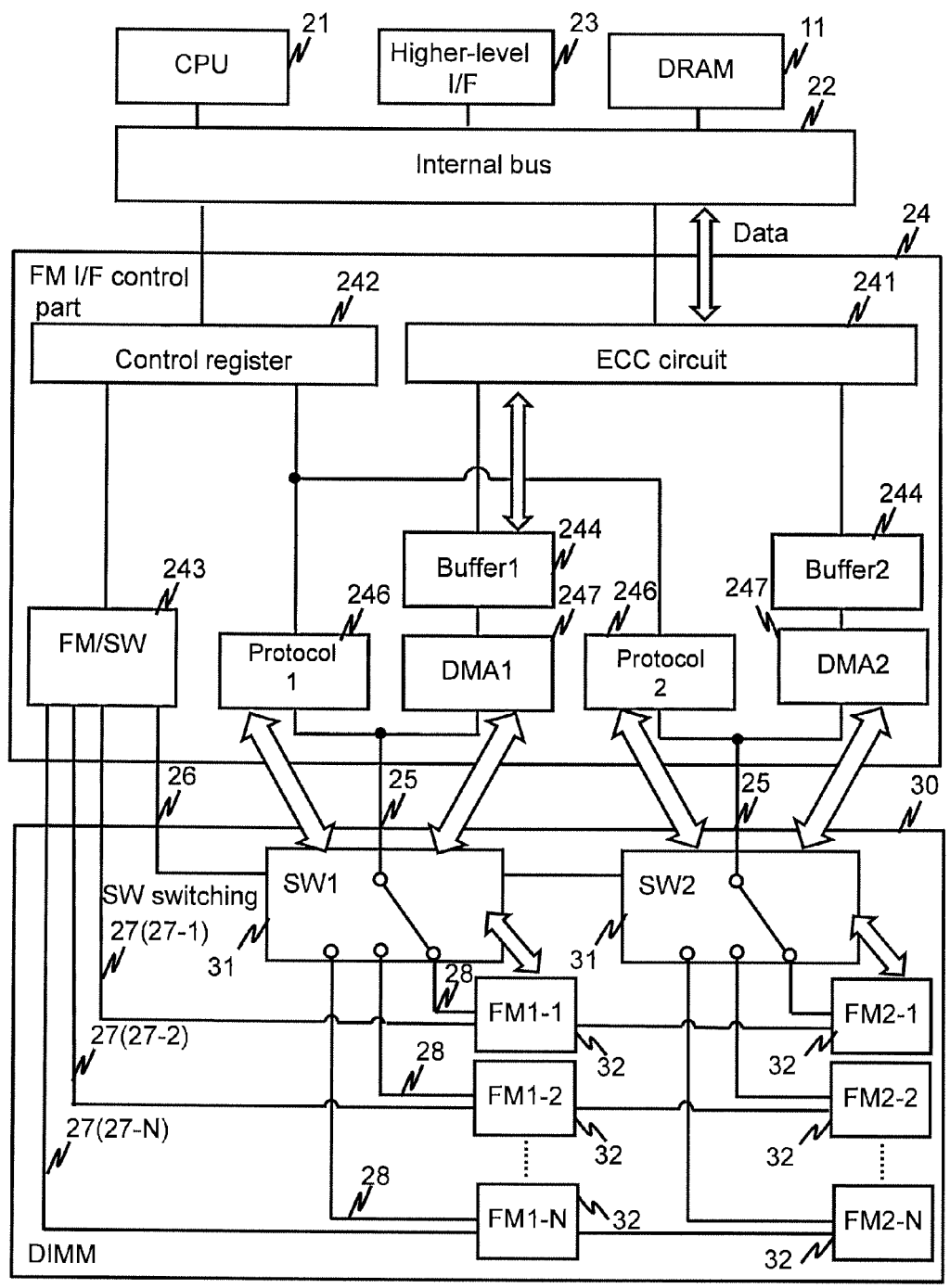
FIG. 4 shows a detailed example of a portion of the configuration of the flash memory package related to the embodiment.

An FM I/F control part 24, which is an example of a media interface of the flash memory PKG 10, outputs to the FM chip 32 a chip enable signal (CE signal), data to be written to this FM chip 32, and the address that will serve as the write destination of this data. In this embodiment, as shown in FIG. 4, a signal line 27 of the CE signal, which is outputted from the FM I/F control part 24, is disposed so as to be coupled to multiple FM chips 32. In the FM I/F control part 24, since there may be one output terminal (pin) for one CE signal line 27, there may be fewer pins than there are FM chips 32. For this reason, it is possible to reduce the area needed for pins array in the ASIC or other such circuit comprising the FM I/F control part 24.

Also, in this embodiment, as shown in FIG. 4, buses (bus: called a bus even though a control line is not included) 25, over which flow data, addresses or other such signals (signals other than the CE signal) outputted from the FM I/F control part 24, are respectively coupled to switches 31. Also, M (M being an integer of 2 or larger, for example, M=4) FM chips 32 are coupled to the switch 31 via a bus 28. The switch 31 is configured so as to switch the coupling between the bus 25 and any of the buses 28. Since data, addresses and the like are exchanged via the bus 25 in a read and write with respect to the FM chip 32, the pin to which the bus 25 is coupled may be reserved in the FM I/F control part 24. Therefore, it is possible to reduce the area needed for pins array in the ASIC or other such circuit comprising the FM I/F control part 24. Furthermore, since any of multiple buses 28 is connected to the bus 25 using the switch 31, a state in which multiple buses 28 are electrically coupled does not occur. For this reason, it is possible to hold down the load capacity on all the interconnects coupled to the FM chip 32 via the bus 25, and to ensure relatively high quality data exchanges between FM chips 32.

Next, the embodiment will be explained in detail.

FIG. 1 shows an example of the configuration of a computer system related to this embodiment.

The computer system comprises a storage system 1 and a host computer (may also be called host) 200. The number of storage systems 1 and hosts 200 can both be one or more. The storage system 1 and the host 200 are coupled to one another via a communication network (for example, a SAN (Storage Area Network). The storage system 1 stores data that is used by the host 200. The host 200 executes various types of processing, reads data from the storage system 1, and writes data to the storage system 1.

The storage system 1 comprises multiple storage devices, and a RAID (abbreviation of Redundant Array of Independent (or Inexpensive) Disks) controller device 300, which is coupled to these multiple storage devices.

The multiple storage devices include multiple types of storage devices. One or more of at least one type of storage device may exist. The storage devices, for example, include a flash memory device 400, a SSD (Solid State Drive) device 500, a HDD (Hard Disk Drive) device (SAS: Serial Attached SCSI) 600, and a HDD device (SATA: Serial ATA) 700.

The RAID controller device 300 comprises multiple RAID controllers 301. Each RAID controller 301 is coupled via internal buses to the flash memory device 400, the SSD device 500, the HDD device (SAS) 600, and the HDD device (SATA) 700.

Furthermore, the RAID controller 301 is an example of a higher-level apparatus with respect to the flash memory device 400, the SSD device 500, the HDD device (SAS) 600, and the HDD device (SATA) 700. The RAID controller 301 receives an I/O command from a higher-level apparatus with respect to the RAID controller 301 (for example, the host 200), and performs access control to the flash memory device 400, the SSD device 500, the HDD device (SAS) 600, or the HDD device (SATA) 700 in accordance with this I/O command. The RAID controller 301 may perform processing for managing the respective storage areas of the flash memory device 400, the SSD device 500, the HDD device (SAS) 600, and the HDD device (SATA) 700 as respectively different storage tiers, and for allocating a storage area of any storage tier to the logical area that serves as the write-destination of the data.

It is supposed here that the SSD device 500 has a larger number of possible flash memory writes than the flash memory device 400, and, alternatively, that the flash memory device 400 is superior from the aspects of reading speed and costs. For this reason, the RAID controller 301 may store data that is read relatively frequently in the flash memory device 400, and may store data that is written relatively frequently in the SSD device 500.

FIG. 2 shows an example of the configuration of the flash memory device related to this embodiment.

The flash memory device 400 comprises one or more higher-level I/F switches (higher-level I/F Switch) 401, and one or more flash memory packages (PKG) 10. The higher-level I/F switch 401 relays data between the RAID controller 301 and multiple flash memory PKGs 10.

FIG. 3 shows an example of the configuration of the flash memory package related to this embodiment.

The flash memory PKG 10 comprises a DRAM (Dynamic Random Access Memory) 11 as an example of a main storage memory, and, in addition, comprises a FM controller 20, and multiple (or one) DIMM (Dual Inline Memory Module) 30. The DRAM 11 stores data and so forth used by the FM controller 20. The DRAM 11 may be installed in the FM controller 20, or may be installed in a different component than the FM controller 20.

The FM controller 20, for example, is configured using one ASIC (Application Specific Integrated Circuit), and comprises a CPU 21, an internal bus 22, a higher-level I/F (Interface) 23, and multiple (or one) FM I/F control part 24. The internal bus 22 is communicably coupled to the CPU 21, the higher-level I/F 23, the DRAM 11, and the FM I/F control part 24.

The higher-level I/F 23 is coupled to the higher-level I/F switch 401, and relays communications with a higher-level apparatus. The higher-level I/F 23, for example, is a SAS I/F. The FM I/F control part 24 relays data exchanges with multiple FM chips 32. In this embodiment, the FM I/F control part 24 comprises multiple combinations of buses (data buses and the like), which execute exchanges with a FM chip 32, and uses the multiple buses to relay data exchanges with multiple FM chips 32. In this embodiment, a FM I/F control part 24 is provided for each DIMM 30, and the FM I/F control part 24 relays the communication of multiple FM chips 32 of the DIMM 30 coupled to this control part 24. Furthermore, the FM I/F control part 24 may be in charge of two or more DIMM 30. The CPU 21 is able to execute various processing by executing a program stored in the DRAM 11 (or another storage area not shown in the drawing). There may be multiple CPUs 21, and the multiple CPUs 21 may share the various processing. Specific processing by the CPU 21 will be described further below.

The DIMM 30 comprises one or more SW 31, and multiple FM chips 32. The FM chip 32, for example, is a MLC (Multi Level Cell)-type NAND flash memory chip. The MLC-type FM chip is characterized in that it is inferior to the SLC-type FM chip with regard to number of times it is capable of being rewritten, but provides a lot of storage capacity per cell.

The SW 31 is coupled to the FM I/F control part 24 via a bus 25 comprising a data bus. In this embodiment, the SW 31 is disposed so as to support one of a combination of buses 25 comprising a data bus coupled to the FM I/F control part 24. The SW 31 is coupled to multiple FM chips 32 via a bus 28 comprising a data bus. The SW 31 is configured so as to selectively couple the bus 25 from the FM I/F control part 24 to the bus 28 of any FM chip 32 in accordance with switching. Here, the SW 31 and multiple FM chips 32 are disposed and interconnected in the DIMM 30, thereby doing away with the need to provide other connectors for coupling these components, making it possible to reduce the number of connectors required.

Furthermore, according to FIG. 3, a FM chip 32 is coupled to the SW 31 without going through another FM chip 32, but a FM chip 32 may be coupled to the SW 31 by way of another FM chip 32. That is, two or more FM chips 32 may be coupled in series to the SW 31.

FIG. 4 shows an example of the detailed configuration of a portion of the flash memory package related to this embodiment.

The FM I/F control part 24 comprises a ECC (Error Correcting Code) circuit 241, a control register 242, a FM/SW control part 243, a buffer 244, a FM bus protocol control part (depicted in the drawing as "protocol 1, protocol 2") 246, and a DMA (Direct Memory Access) part 247. In this embodiment, a number of combinations (for example, two) of the buffer 244, the FM bus protocol control part 246, and the DMA part 247 is equivalent to the number of data buses with respect to which the FM I/F control part 24 is in charge.

In the DRAM 11, as will be described further below, write-target data is partitioned into multiple data elements. The ECC circuit 241 reads the write-target data elements from the DRAM 11, executes an error correcting process for generating an error correcting code corresponding (for example, added) to the write-target data elements, and writes the write-target data elements and the error correcting codes corresponding to these data elements to the buffer 244.

The ECC circuit 241 also reads data comprising a read-target data element and the error correcting code corresponding to this data element from the buffer 244, and uses the error correcting code corresponding to the data element to determine whether an error has occurred in the read-target data element. In a case where the result of this determination is affirmative, the ECC circuit 241 executes an error correcting process for correcting the error in the read-target data element. The ECC circuit 241 stores the read-target data in the DRAM 11.

In this embodiment, the ECC circuit 241 is in charge of error correcting code creation processing and error correcting processing for multiple FM chips 32 coupled to multiple data buses. Furthermore, there may be either one or multiple code creation circuit parts for executing the error correcting code creation process, and error correcting circuit parts for executing the error correcting process. The size of the FM I/F control part 24 can be held in check by suppressing the number of code creation circuit parts and/or error correcting circuit parts. Furthermore, since the circuit size of the code creation circuit part is relatively small, multiple code creation circuit parts may exist. In any case, since at least the error correcting circuit part is shared with respect to multiple data buses, a reduction in the circuit size can be expected.

The control register 242 stores information required for controlling access to the FM chip 32. The information required for controlling access is for example CPU 21 controlling, and is configured by the FM bus protocol control part 246.

The FM/SW control part 243, in accordance with the control register 242 setting, outputs a signal (switching signal) for switching multiple SWs 26 of the DIMM 30 and a chip enable signal (CE signal) for selecting an access-target FM chip 32. In this embodiment, multiple CE signal lines 27 (27-1, 27-2, 27-3) and a signal line 26 for switching signal use (a switching signal line) shared by these CE signal lines 27 are coupled to the FM/SW control part 243. Each CE signal line 27 is coupled to different FM chips 32 subordinate to different SWs 31.

The switching signal line 26 coupled to the FM/SW control part 243 is coupled to multiple SWs 31 (SW 1, SW 2) of the DIMM 30. In accordance with this, the same switching signal is supplied to multiple SWs 31. For example, it is supposed that an FM chip 32 coupled to the same CE signal line 27 is coupled to the same number pin with respect to all of the multiple SWs 31 in the same DIMM 30. In accordance with this, in a case where these multiple SWs 31 receive the same switching signal, the coupling-destination of each SW 31 can be an FM chip 32 coupled to the same CE signal line 27. Therefore, it is possible to make the multiple FM chips 32 coupled to the same CE signal line 27 the write-destinations of multiple data elements, consequently making it possible to write these multiple data elements in parallel.

The CE signal line 27 coupled to the FM/SW control part 243 is coupled to multiple FM chips 32 for which multiple SWs 31 are in charge. In this embodiment, the CE signal line 27-1 is coupled to FM #1-1 and FM #2-1, CE signal line 27-2 is coupled to FM #1-2 and FM #2-2, and, similarly, CE signal line 27-N is coupled to FM #1-N and FM #2-N. In accordance with this configuration, a CE signal is supplied substantially simultaneously to multiple FM chips 32 coupled to the same CE signal line 27. For this reason, these FM chips 32 can be operated in parallel substantially simultaneously. In this embodiment, when a switching signal is supplied, in SW #1 and #2, the buses comprising the data buses of the FM chips 32 coupled to the same CE signal line 27 are switched so as to be coupled to the FM I/F control part 24.

The buffer 244 temporarily stores a data element, which is targeted to be written to a FM chip 32, and the error correcting code thereof. The buffer 244 also temporarily stores a read-target data element, which has been read from the FM chip 32, and the error correcting code thereof.

The DMA 247 reads the write-target data element and error correcting code thereof stored in the buffer 244, and writes these to the FM chip 32. The DMA 247 also reads the read-target data element and the error correcting code thereof from the FM chip 32, and writes these to the buffer 244.

The FM bus protocol control part 246 issues (outputs) a command (a read command or a program command) to the FM chip 32 in accordance with the control register 242 setting. The FM bus protocol control part 246 also checks the FM chip 32 operation result (status) with respect to the command, and configures the operation result in the control register 242.

A data bus is coupled to the DMA 247, a command signal line is coupled to the FM bus protocol control part 246, and the bus 25, which comprises a data bus and a command signal line, is coupled to the SW 31.

The switching signal line 26 is coupled to the SW 31, and, in addition, the bus 25, which comprises a data bus, is coupled to the SW 31. In this embodiment, the same switching signal line 26 is coupled to the SWs #1 and #2. Also, the buses, which comprise data buses linked to multiple FM chips 32, are coupled to the SW 31. The SW 31 selectively couples anyone of multiple buses 28 to the bus 25 on the basis of a switching signal supplied via the switching signal line 26. According to this SW 31, it becomes possible to access multiple FM chips 32 using a single bus 25. Also, since the SW 31 selectively couples any one of multiple buses 28 to the bus 25, the load capacity of the bus when sending a signal can be held in check, and signal quality can be maintained at a high level. In this embodiment, when the switching signal is supplied, switching is performed in the SWs #1 and #2 such that the bus 28, which comprises the data buses of the FM chips 32 coupled to the same CE signal line 27, is coupled to the bus 25 linked to the FM I/F control part 24.

Figure 5:
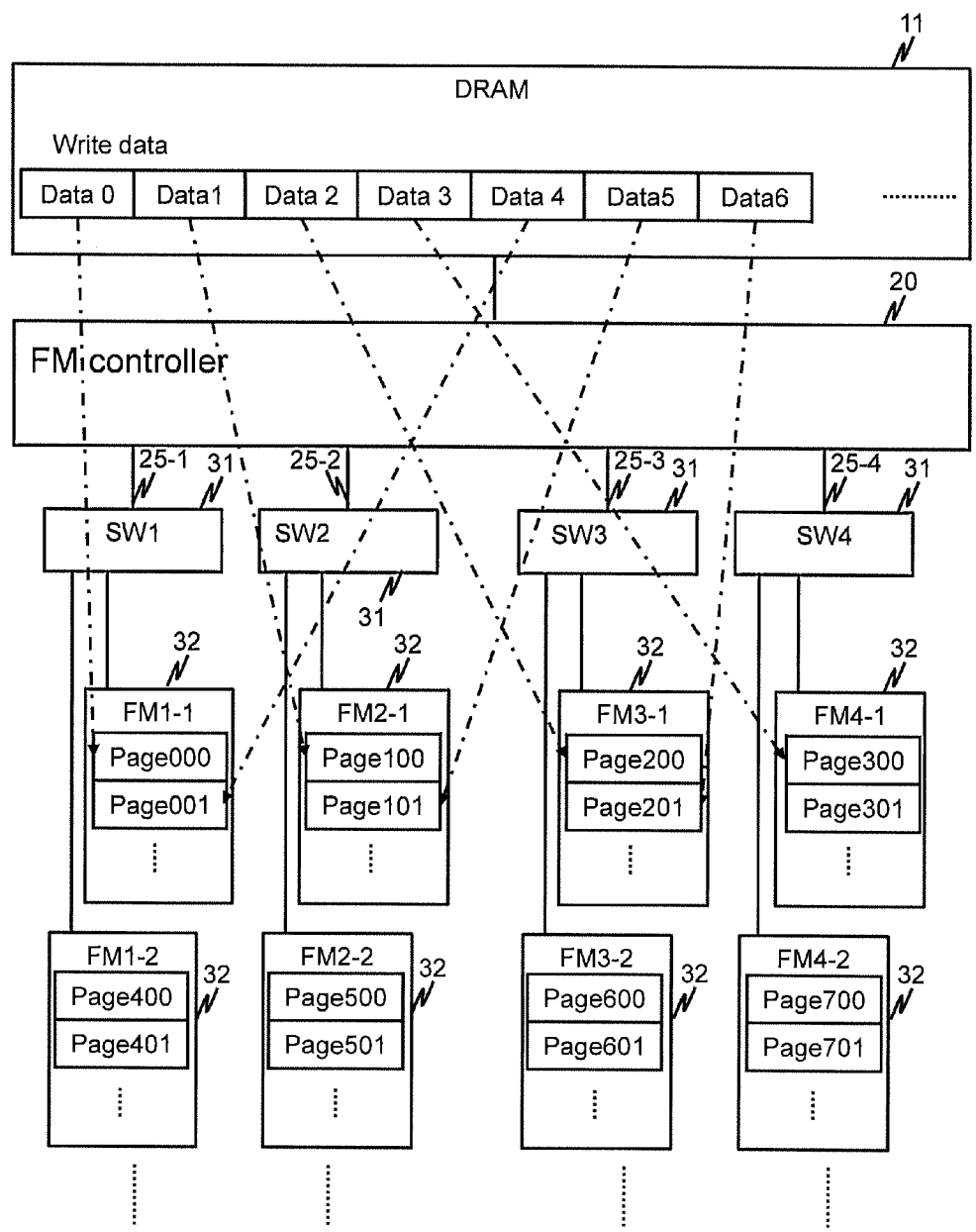
FIG. 5 is a diagram illustrating a first example of a write process related to the embodiment.

FIG. 5 is a diagram illustrating a first example of a write process related to this embodiment.

The FM controller 20 stores write-target data (write data) in the DRAM 11, partitions the write data into multiple data elements (#0 through #6), and transfers these multiple data elements to multiple FM chips 32. The "write data" referred to here typically is either all or part of data that the RAID controller 301 has received from the host 200. Also, the size of the data element is based on the page size of the FM chip 32 and the size of the ECC. In a case where the data element is compressed and stored in a page, the size of the data element may be larger than the page size. A data element and an ECC are stored in the page.

A specific example of the write process will be explained in detail below.

First, the FM controller 20 (for example, the CPU 21) switches SW #1, couples FM chip #1-1 to bus 25-1, and transfers data element #0 to FM chip #1-1 via the bus 25-1. The data element #0 is written to page #000 of the FM chip #1-1. The FM controller 20 (for example, the CPU 21) also switches SW #2, couples FM chip #2-1 to bus 25-2, and transfers data element #1 to FM chip #2-1 via the bus 25-2. The data element #1 is written to page #100 of FM chip #2-1. Furthermore, the FM controller 20 may send a CE signal via the CE signal line 27-1 coupled to the FM chips #1-1 and #2-1. In accordance with this, the data elements #0 and #1 can be written in parallel to the FM chips #1-1 and #2-1.

Similarly, the FM controller 20 switches SW #3 and transfers data element #2 to FM chip #3-1, and switches SW #4 and transfers data element #3 to FM chip #4-1. Furthermore, the FM controller 20 may send a CE signal via the CE signal line 27 coupled to the FM chips #3-1 and #4-1. In accordance with this, the data elements #2 and #3 can be written in parallel to the FM chips #3-1 and #4-1.

Next, the FM controller 20 transfers data element #4 to the FM chip #1-1 via bus 25-1. The data element #4 is written to page 001 of FM chip #1-1. Similarly, the FM controller 20 transfers data element #5 to the FM chip #2-1, and transfers data element #6 to the FM chip #3-1.

When the FM controller 20 transfers data element #0 to FM chip #1-1 here, the bus 25-1 transitions to a busy state, and during the busy state, it is not possible to transfer the data via the bus 25-1. Also, the data element #0, which was transferred to FM chip #1-1, is written to page #000 subsequent to being stored in a buffer (not shown in the drawing) inside the FM #1-1. The FM #1-1 transitions to the busy state until the write of data element #0, which is being stored in the buffer, is complete. Generally speaking, in the case of a write process, the busy state of the FM chip 32 lasts longer than the busy state of the bus 25. For this reason, when the FM controller 20 transfers the data element #4 to the FM chip #1-1, the FM chip #1-1 may be in the busy state, in which case, the FM controller 20 transfers the data element #4 after the busy state of the FM chip #1-1 has been released.

Furthermore, in the flow of processing described above, a data element (for example, #0) on the DRAM 11 is stored in the buffer 244 (for example #1) coupled to the SW 31 (for example, #1) to which the transfer-destination FM chip 32 (for example, #1-1) of this data element is coupled. In accordance with an instruction from the CPU 21, the protocol control part 246 (for example, #1) boots up the DMA 247 (for example, #1). The booted DMA 247 transfers the data element (for example, #0) inside the buffer 244 (for example, #1) to the FM chip 32 (for example, #1-1), which is the storage destination of this data element. In a case where the data element (for example, #0) is written to the FM chip 32 (for example, #1-1), a complete status is sent from this FM chip 32

(for example, #1-1) to the protocol control part 246 (for example, #1). The protocol control part 246 (for example, #1) may write information denoting the fact that this complete status has been received to the control register 242. The CPU 21, by referring to the control register 242, is able to learn that a data element (for example, #0) has been written to an FM chip 32 (for example, #1-1).

As described hereinabove, the FM controller 20 partitions the write data into multiple data elements, and sequentially transfers two or more contiguous data elements to different FM chips 32. For this reason, the time during which the bus 25 and the FM chip 32 are in the busy state can be used to transfer the data to another FM chip 32 via another bus, thereby making it possible to transfer data efficiently.

Furthermore, in a case where yet different write data has been stored in the DRAM 11, the FM controller 20 stores this different write data starting from the FM chip 32 (for example, #2-1) subsequent to the FM chip 32 (for example, #1-1) comprising the page in which the end data element of the write data of the previous time is stored. This different write data is also partitioned into multiple data elements, and these multiple data elements are written in parallel. Then, in a case where the data elements have been written up to the end page of the FM chips #1-1, #2-1, #3-1, and #4-1 (that is, the first tier of the FM chip group), the FM controller 20 switches the coupling destination of each SW 31 from the FM chips 32 that belong to the first tier of the FM chip group to FM chips that belong to a different tier of the FM chip group (for example, FM chips #1-2, #2-2, #3-2, and #4-2 that belong to the second tier of the FM chip group), and transfers the data elements to these FM chips 32. Thereafter, in a case where an overwrite with respect to the stored write data (a write that makes the write destination the same logical area of the logical address space provided by the flash memory device 400), the FM controller 20 switches SW 31, and distributively transfers data to the $n^{th}$ tier of the FM chip group, the $(n+1)^{th}$ tier of the FM chip group, and so forth (where n is an integer equal to or larger than 1). In this processing, when the FM chip 32 of the $n^{th}$ tier of the FM chip group is in the busy state, the FM controller 20 may transfer the data element to a FM chip 32 of the $(n+1)^{th}$ tier of the FM chip group.

In this embodiment, as described hereinabove, the CE signal line 27 is shared by multiple FM chips 32 (more accurately, by multiple FM chips 32 coupled to different SWs 31). The FM controller 20 can transfer the two contiguous data elements #0 and #1 in parallel to FM #1-1 and FM #2-1 by switching the SW #1 and coupling the FM chip #1-1 and the bus 25-1, and by switching the SW #2 and coupling the FM chip #2-1 and the bus 25-2. In addition, the FM controller 20, after transferring the data element #0 to the FM chip #1-1 and the data element #1 to the FM chip #2-1, simultaneously (in parallel) boots up the FM chip #1-1 and the FM chip #2-1 by sending a CE signal via the CE signal line 27-1. In accordance with this, the FM chip #1-1(#2-2) writes the received data element #0 (#1).

That is, the FM controller 20 partitions the write data into multiple data elements, sequentially selects the SWs, makes the FM chips 32 that are coupled to the same CE signal line the SW coupling destinations, parallelly transfers two or more contiguous data elements to two or more FM chips 32 coupled to the same CE signal, and sends the CE signal via this same CE signal line. This makes it possible to write the write data more efficiently. When the FM controller 20 transfers multiple data elements, each SW may be controlled so as to switch independently, or may be controller to switch synchronously.

Figure 15:
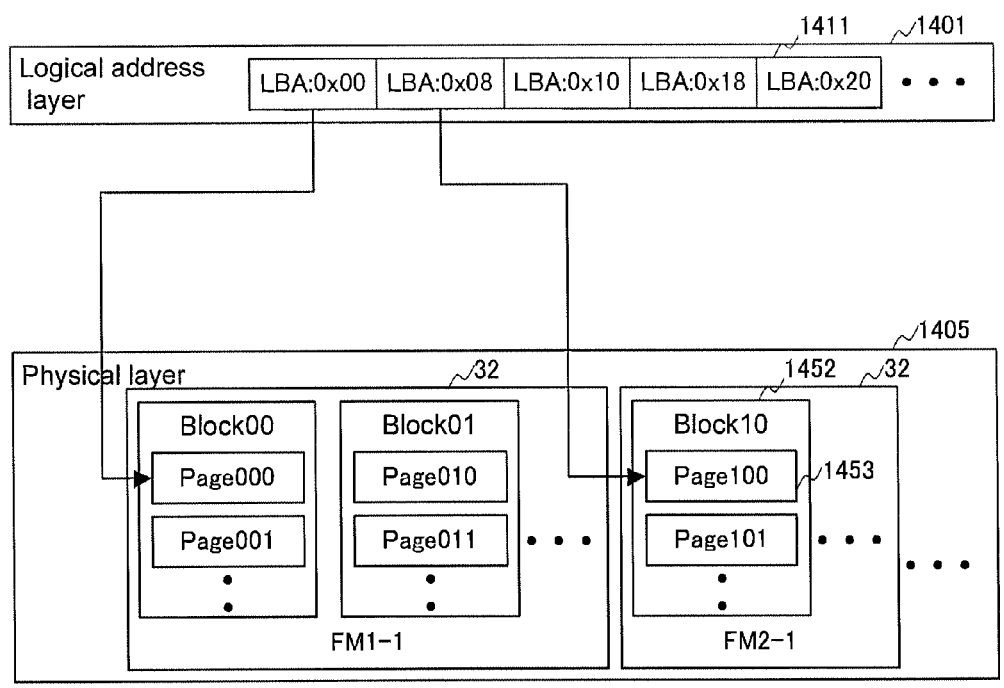
FIG. 15 shows an example of the relationship between a logical address layer and a physical layer related to the embodiment.

FIG. 15 shows an example of the relationship between a logical address layer and a physical layer related to this embodiment.

The logical address layer 1401 is a logical address space that the flash memory device 400 provides to a higher-level apparatus (for example, either the RAID controller 301 or the host 200). As used here, a logical address, for example, may be a LBA (Logical Block Address). The logical address space 1401 is managed by being partitioned into multiple logical areas 1411.

The physical layer 1405 is a storage area of multiple FM chips 32, and comprises multiple blocks 1452. Each block 1452 comprises multiple pages 1453.

A logical area 1411 is associated with a physical page 1453. Logical-physical translation information, which denotes which logical area 1411 corresponds to which page 1453, for example, is stored in a storage area (for example, the DRAM 11) of the FM controller 20. This information may be backed up on one or more FM chips 32.

For example, in FIG. 15, the logical area 1411 from LBA 0x00 to 0x07 is allocated to page #000 of block #00 of FM chip #1-1, and the logical area 1411 from LBA 0x08 to 0x0F is allocated to page #100 of block #10 of FM chip #2-1. Thus, in a case where a read request specifying any LBA from LBA 0x00 to 0x07 is issued from the RAID controller 301, which is one of the higher-level apparatuses with respect to the flash memory device 20, the FM controller 20 receives this read request, and in accordance with this read request, reads the data element from page #000 based on the logical-physical translation information, and returns this read data element to the higher-level apparatus.

FIG. 17 shows an example of the configuration of the logical-physical translation information.

The logical-physical translation information T601 comprises for each page the number of a block comprising the page, the number of the page, a page attribute (valid page, invalid page, or free page), and the logical address of the page allocation-destination logical area (for example, the first address). The CPU 21, by referring to this information T601, can identify which FM chips have free blocks, which block(s) in an FM chip group have/has the least valid pages, and which page is allocated to which logical area. Furthermore, the "FM chip group" referred to in this paragraph is one or more FM chips 32, and, for example, is multiple FM chips 32 coupled to the same FM I/F control part 24, multiple FM chips 32 coupled to the same SW 31, or identified FM chips 32.

Although a logical address specified to the RAID controller 301 from the host 200 and a logical address that the RAID controller 301 specifies to the flash memory device 400 may be the same, these logical addresses differ in this embodiment.

An example of the difference between a distributed write of write data by the FM controller 20 and RAID striping by the RAID controller 301 will be explained below by referring to FIG. 16.

Figure 16:
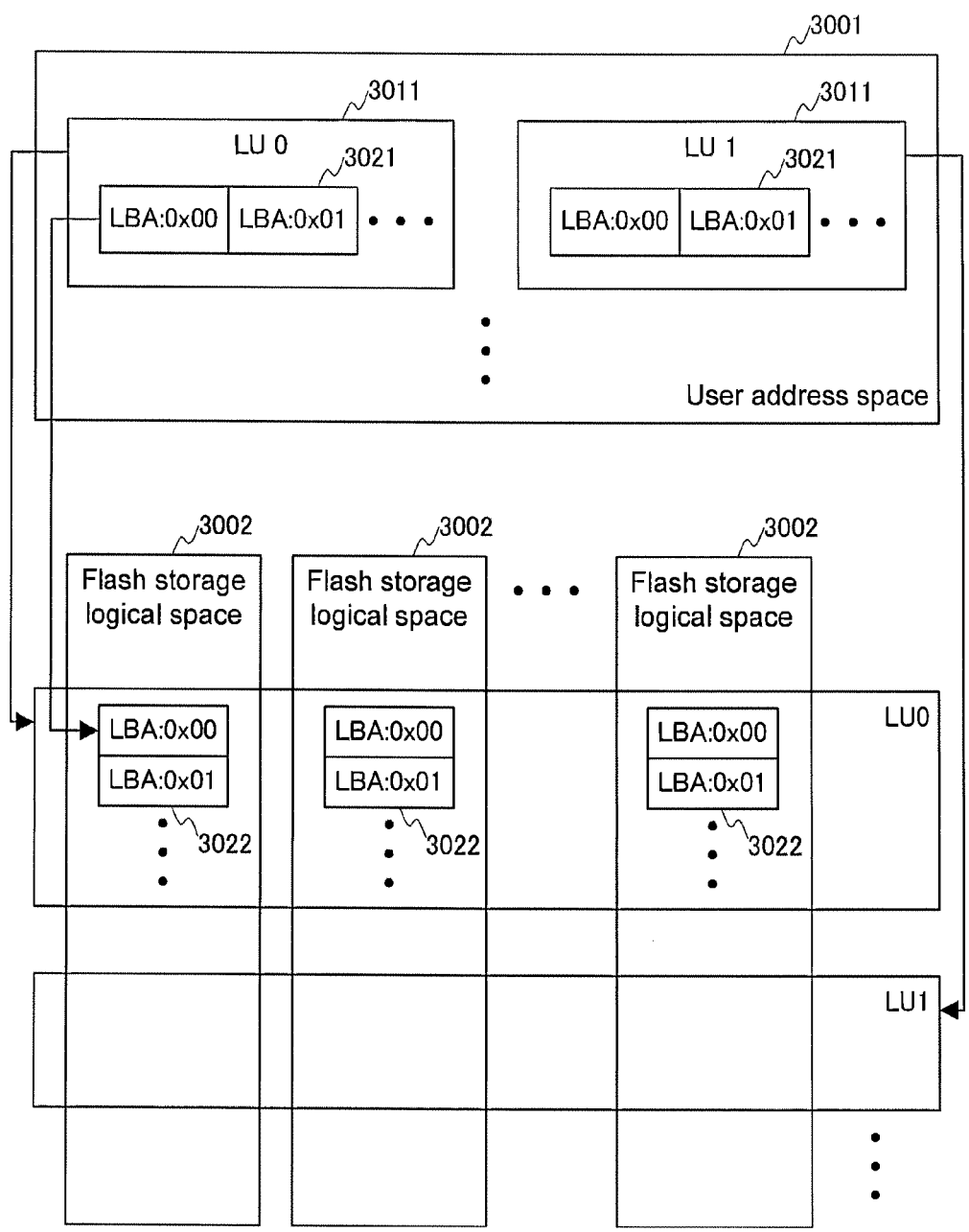
FIG. 16 shows an example of the relationship between a user address space and a flash storage logical space related to the embodiment.

FIG. 16 shows an example of the relationship between a user address space and a logical address space related to this embodiment.

The user address space 3001 is decided in accordance with a LU (Logical Unit) number and the logical address (LBA) thereof. In this drawing, there are multiple LUs 3011, and each LU 3011 comprises multiple logical blocks 3021. A logical block 3021 is allocated to multiple logical blocks 3022 of the same logical address of multiple different flash storage logical spaces 3002. The above-described logical area 1411 (refer to FIG. 15) comprises one or more logical blocks 3022. The flash storage logical space 3002 typically is a logical address space 1401 provided by the flash memory device 400.

According to this drawing, user address space 3001-related striping signifies that one logical block 3021 spans multiple different flash storage logical spaces 3002. Alternatively, flash storage logical space 3002 (logical address space 1401)-related striping, according to FIG. 15, signifies that two or more contiguous logical areas 1411 of an address span two or more different FM chips 32 having a common CE signal line 27.

Furthermore, the LU 3011 may be a pool LU comprising a segment that is allocated to a virtual LU (TP-LU) area that conforms to thin provisioning. The pool LU is a LU that makes up a capacity pool, and is managed by being partitioned into multiple segments. A segment is allocated to the TP-LU area. In this case, the segment may comprise one or more logical blocks 3021.

Figure 6:
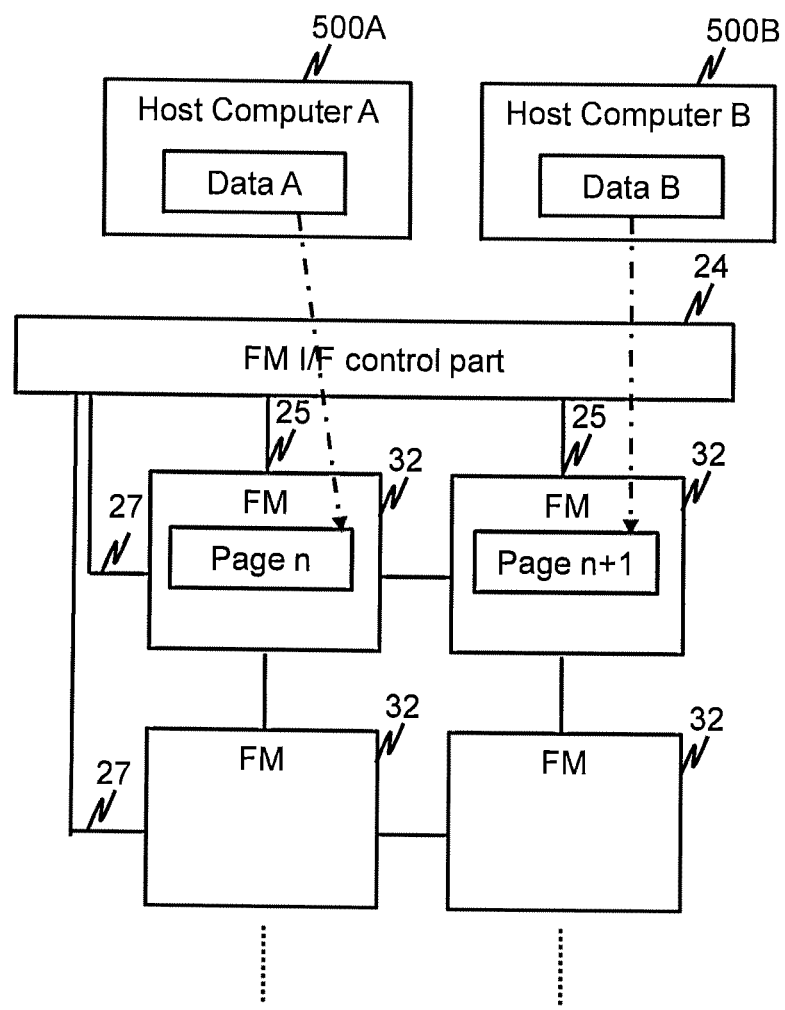
FIG. 6 is a diagram illustrating a second example of a write process related to the embodiment.

FIG. 6 is a diagram illustrating a second example of a write process related to this embodiment.

In a case where a process for writing a data element #A of a host #A (for example, either write data of equal to or smaller than the page size, or the end data element of the write data) and a process for writing a data element #B of a host #B (for example, either write data of equal to or smaller than the page size, or the first data element of the write data) have been generated, the FM controller 20 decides to store the data element #A in a FM chip 32, and to store the data element #B in a FM chip 32 that is coupled to the same CE signal line 27 as this FM chip 32, and writes the data elements #A and #B to these FM chips 32 substantially simultaneously (parallelly). In accordance with this, data can be rapidly written from multiple hosts.

Figure 7:
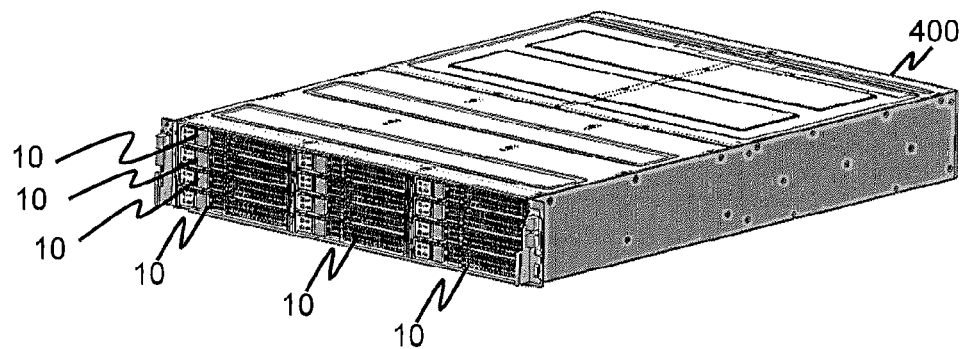
FIG. 7 is an example of an oblique view from above the front side of the flash memory device related to the embodiment.

FIG. 7 is an example of an oblique view from above the front side of the flash memory device 400.

The height of the flash memory device 400, which constitutes a shape that enables the flash memory device 400 to be mounted to a standard 19-inch wide rack, for example, is 2 U. The flash memory device 400, for example, is configured so as to enable 12 flash memory PKGs 10 (three columns×four rows) to be loaded.

Figure 8:
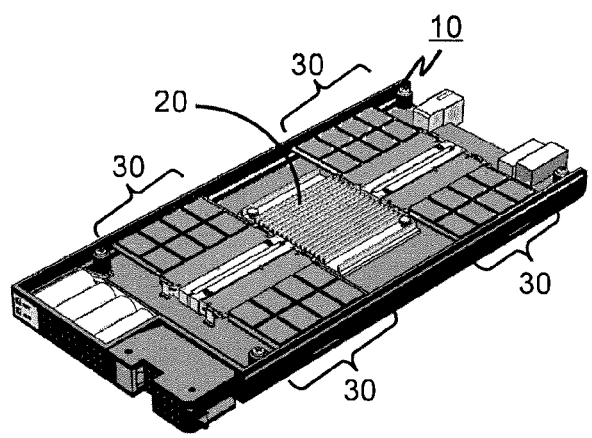
FIG. 8 is an example of an oblique view from the top side of the flash memory PKG related to the embodiment.
Figure 9:
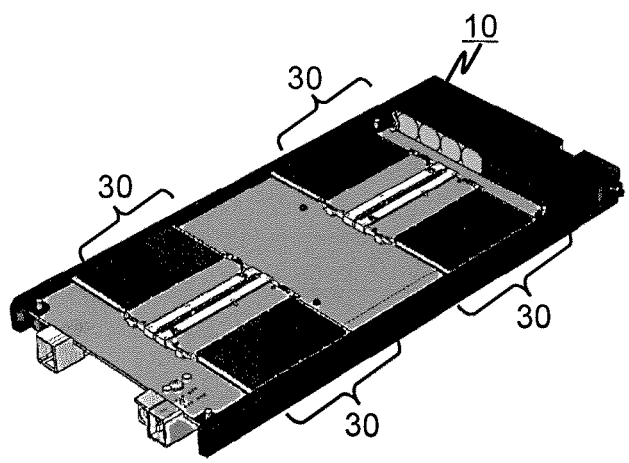
FIG. 9 is an example of an oblique view from the bottom side of the flash memory PKG related to the embodiment.

FIG. 8 is an example of an oblique view from the top side of the flash memory PKG 10, and FIG. 9 is an example of an oblique view from the bottom side of the flash memory PKG 10.

On the top side of the flash memory PKG 10, the FM controller 20, which is an ASIC, is arranged substantially in the center in the planar direction of this PKG 10, and two DIMMs 30 each are respectively arranged on the near side and far side thereof. Also, on the bottom side of the flash memory PKG 10, two DIMMs 30 are respectively arranged on the near side and the far side of the area of the bottom side of the FM controller 20. Therefore, eight DIMMs 30 are arranged in the flash memory PKG 10. Since the FM controller 20 is arranged substantially in the center like this, the length of the interconnect from the FM controller 20 to each DIMM 30 can be made substantially uniform.

Figure 10:
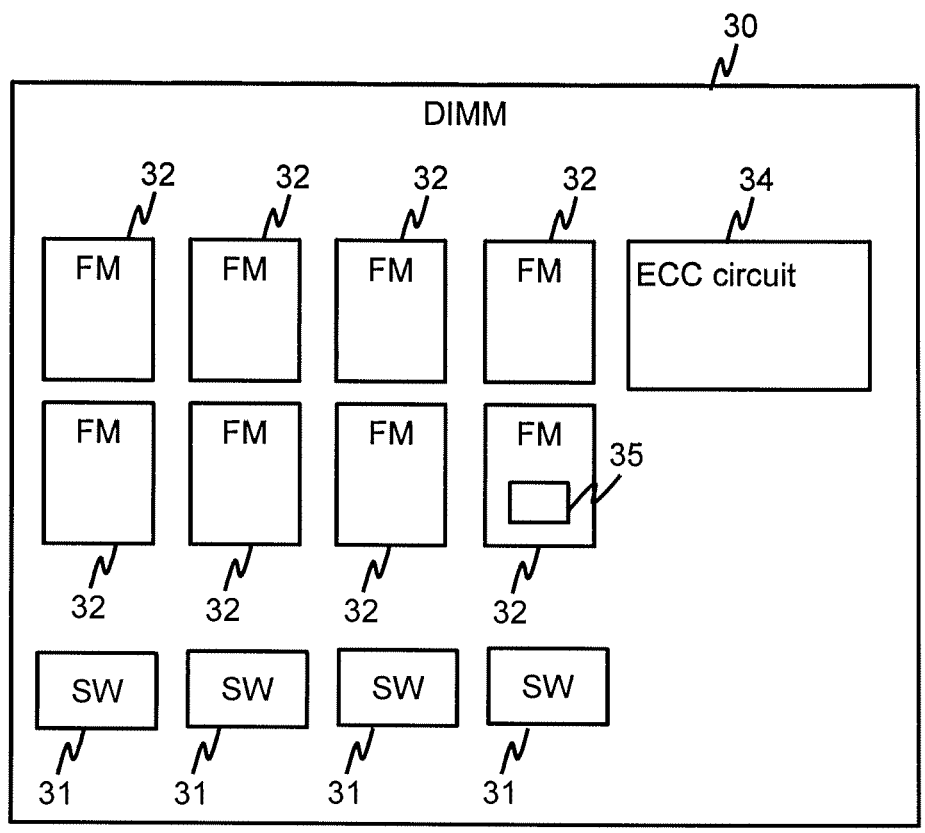
FIG. 10 shows an example of a simplified configuration of a DIMM related to the embodiment.

FIG. 10 shows an example of a simplified configuration of a DIMM 30.

The DIMM 30, for example, comprises eight FM chips 32 and two SWs 31. One SW 31 switches the buses to four FM chips 32.

Furthermore, the numbers of FM chips 32 and SWs 31 in the DIMM 30 is not limited to the numbers shown in FIG. 10.

The DIMM 30 may also comprise an ECC circuit 34. An ECC circuit 35 may be provided for each FM 32. In a case where either the DIMM 30 or the FM 32 comprises the ECC circuit, the FM IF control part 24 need not comprise the ECC circuit 241.

Next, the operation of the flash memory PKG 10 will be explained. Processing in a case where the FM IF control part 24 comprises the ECC circuit 241 will be explained hereinbelow, but in a case where either the DIMM 30 or the FM 32 comprises the ECC circuit, the ECC circuit of either the DIMM 30 or the FM 32 performs the error correcting processing.

Figure 11:
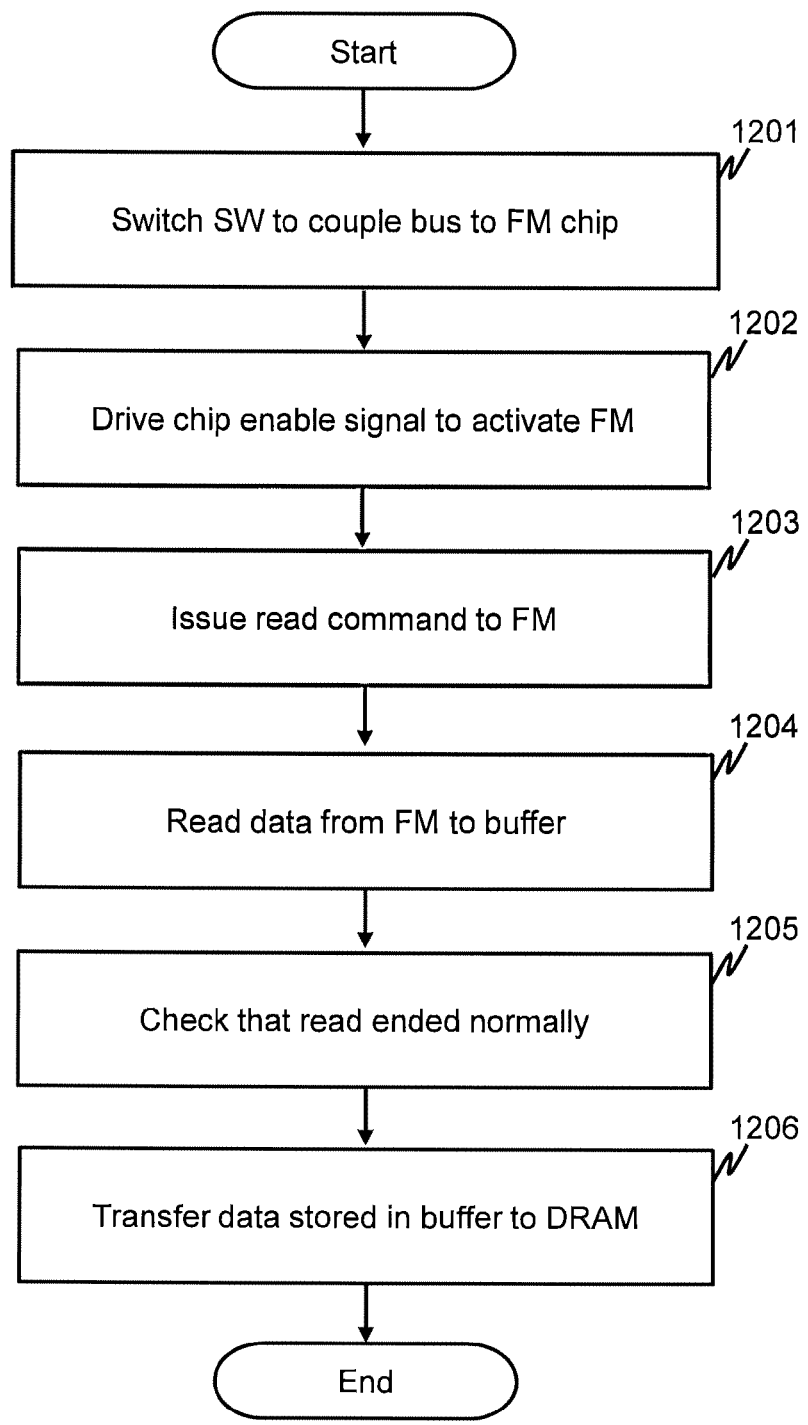
FIG. 11 is an example of a flowchart of a chip read process related to the embodiment.

FIG. 11 is an example of a flowchart of a chip read process.

A chip read process is for reading a data element from a FM chip 32. Prior to the chip read process here, the CPU 21 of the FM controller 20 identifies the read-target FM chip 32, and performs a control setting in the control register 242 of the FM I/F control part 24 for reading a data element from the identified FM chip 32.

First, the FM/SW control part 243 sends a SW 31 switching signal over the switching signal line 26 so that the bus 25 will be coupled to the read-source FM chip 32. In accordance with this, the SW 31 switches the coupling such that the read-source FM chip 32 is coupled to the bus 25 (Step 1201).

The FM/SW control part 243 drives a CE signal via the CE signal line 27 linked to the read-source FM chip 32 to activate the read-target FM chip 32 (Step 1202). Next, the FM bus protocol control part 246 issues a read command via the bus 25 (Step 1203). In accordance with this, the read command is sent to the read-source FM chip 32 by way of the bus 25, the SW 31 and the bus 28. Next, the DMA 247 reads the read-target data element from the read-source FM chip 32, and stores this data element in the buffer 244 (Step 1204).

Next, the FM bus protocol control part 246 acquires the status of the command from the FM chip 32, and stores the status in the control register 242. The CPU 21 refers to the control register 242, checks that the read ended normally (Step 1205), and in the case of a normal end, causes the ECC circuit 241 to perform an error correcting process with respect to the data element read to the buffer 244, and transfers this data element to the DRAM 11 (Step 1206). In accordance with this, the read-target data element is stored in the DRAM 11. Furthermore, after this, the CPU 21 reads the read-target data from the DRAM 11, and sends this data to the higher-level apparatus.

Figure 12:
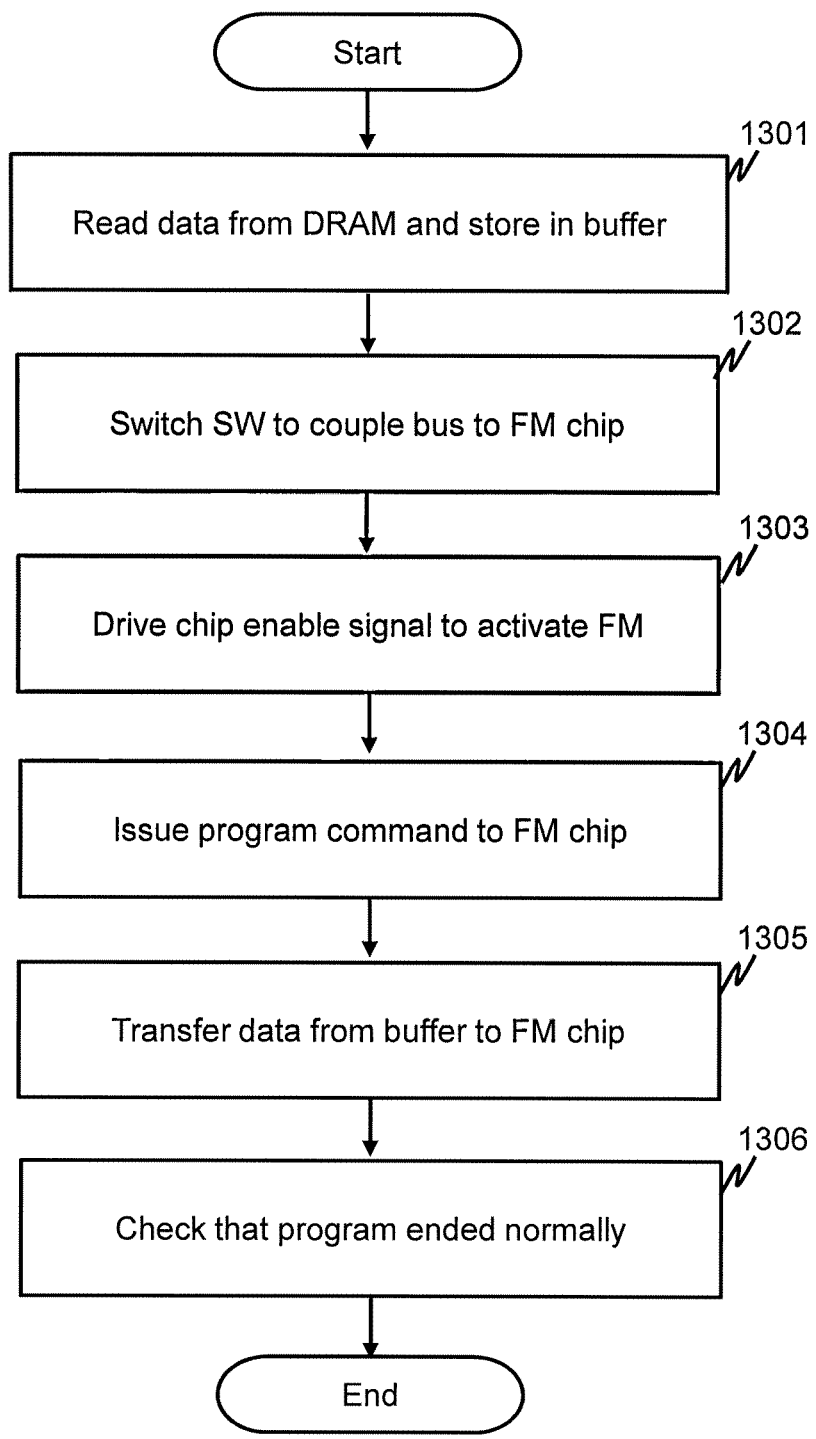
FIG. 12 is an example of a flowchart of a chip write process related to the embodiment.

FIG. 12 is an example of a flowchart of a chip write process.

A chip write process is for writing a data element to a FM chip 32. Prior to the chip write process here, the CPU 21 of the FM controller 20 identifies the write-target FM chip 32, and performs a control setting in the control register 242 of the FM I/F control part 24 for writing a data element to this identified FM chip 32. Also, the write-target data element is stored in the DRAM 11 by the CPU 21.

The CPU 21 reads the write-target data element from the DRAM 11, and delivers this data element to the ECC circuit 241. The ECC circuit 241 creates an ECC corresponding to the write-target data element, and stores data comprising the write-target data element and the ECC (referred to here as the write data in this process flow) to the buffer 244 (Step 1301).

Next, the FM/SW control part 243 sends a SW 31 switching signal over the switching signal line 26 so that the bus 25 will be coupled to the write-destination FM chip 32. In accordance with this, the SW 31 switches the coupling such that the write-destination FM chip 32 is coupled to the bus 25 (Step 1302).

The FM/SW control part 243 drives a CE signal via the CE signal line linked to the write-destination FM chip 32 to activate the write-destination FM chip 32 (Step 1303). Next, the FM I/F sub control part 246 issues a program command (a write command) via the bus 25 (Step 1304). In accordance with this, the program command is sent to the write-destination FM chip 32 by way of the bus 25, the SW 31 and the bus 28. Next, the DMA 247 reads the write data from the buffer 244, and transfers this data to the FM chip 32 (Step 1305).

Next, the FM bus protocol control part 246 acquires the status of the command from the FM chip 32, and stores the status in the control register 242. The CPU 21 refers to the control register 242, checks that the write ended normally (Step 1306), and in the case of a normal end, ends the processing.

Figure 13:
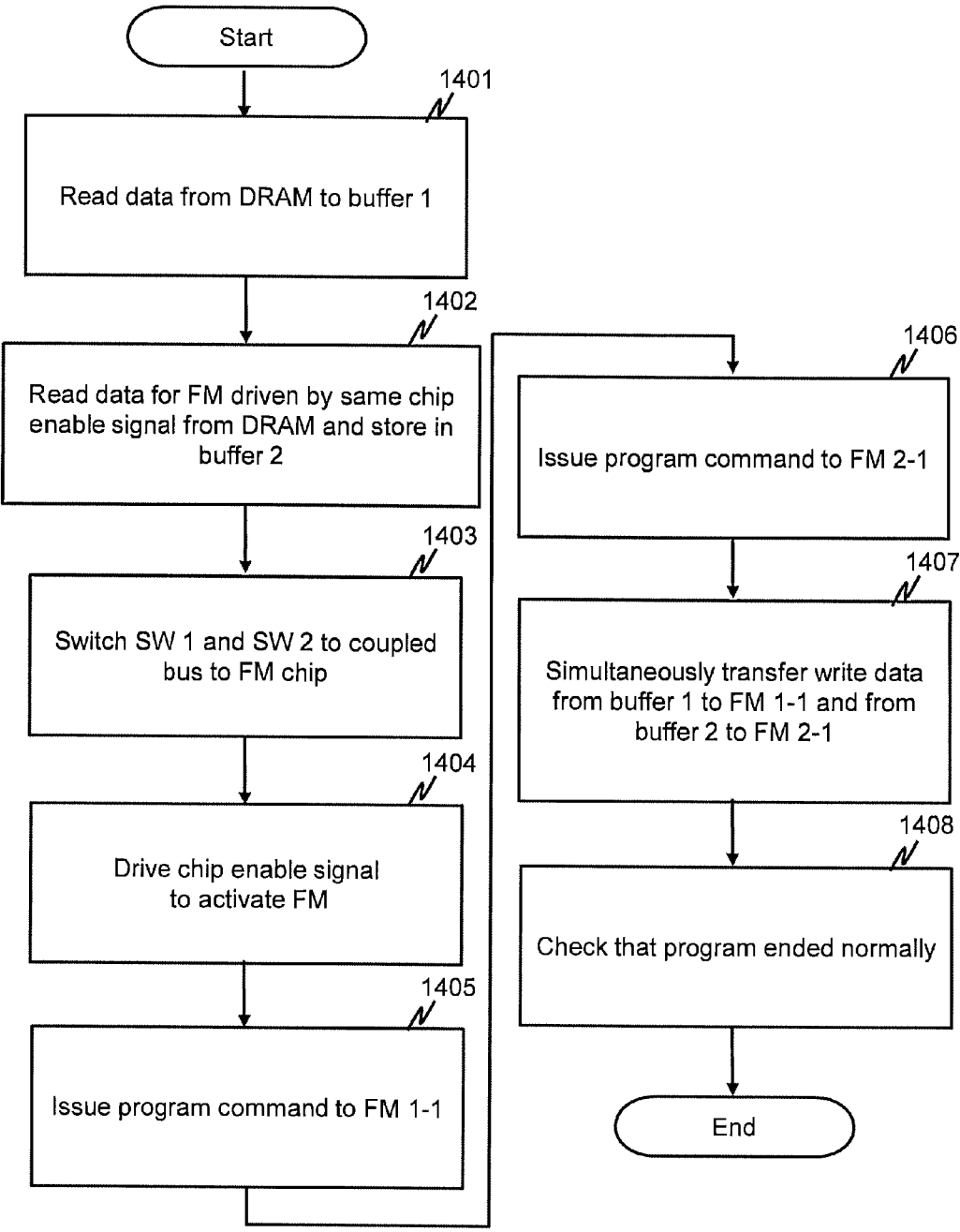
FIG. 13 is an example of a flowchart of a chip multi-write process related to the embodiment.

FIG. 13 is an example of a flowchart of a chip multi-write process.

A chip multi-write process is for parallelly writing multiple data elements to multiple FM chips. Prior to the chip multi-write process here, the CPU 21 of the FM controller 20 identifies multiple write-destination FM chips 32, and performs a control setting in the control register 242 of the FM I/F control part 24 for writing to these FM chips 32. In this embodiment, multiple FM chips 32 coupled to the same CE signal line 27 are identified as write destinations. Also, the write-target data elements are stored in the DRAM 11 by the CPU 21.

The CPU 21 reads a write-target data element to be written to a FM chip 32 (here, for example, the FM chip #1-1 coupled to the SW #1) from the DRAM 11, and delivers this data element to the ECC circuit 241. The ECC circuit 241 creates an ECC corresponding to this write-target data element, and stores data comprising the write-target data element and the ECC (referred to as write data in this processing flow) in the buffer #1 (Step 1401). Next, the CPU 21 reads the write-target data element to be written to a FM chip 32 coupled to the same CE signal line 27-1 as the FM chip #1-1 (for example, FM chip #2-1, which is coupled to SW #2) from the DRAM 11, and delivers this data element to the ECC circuit 241. The ECC circuit 241 creates an ECC corresponding to this write-target data element, and stores data comprising this write-target data element and ECC (the write data) in the buffer #2 (Step 1402).

Next, the FM/SW control part 243 sends SW #1 and #2 switching signals over the switching signal line 26 so that the buses 25-1 and 25-2 will be coupled to the multiple write-destination FM chips #1-1 and #2-1. In accordance with this, the SWs #1 and #2 switch the coupling such that the multiple write-destination FM chips #1-1 and #2-1 are coupled to the buses 25-1 and 25-2 (Step 1403).

The FM/SW control part 243 drives a CE signal via the CE signal line 27-1 linked to the write-destination FM chips #1-1 and #2-1 to activate the multiple FM chips 32 coupled to this CE signal line 27-1 (Step 1404).

Next, a FM I/F sub control part #1 issues a program command (a write command) via the bus 25-1 (Step 1405). In accordance with this, the program command is sent to the write-destination FM chip #1-1 by way of the bus 25-1, the SW #1 and the bus 28. The FM I/F sub control part #2 also issues a program command (a write command) via the bus 25-2 in parallel to this (Step 1406). In accordance with this, the program command is sent to the write-destination FM chip #2-1 by way of the bus 25-2, the SW #2 and the bus 28.

Next, the DMA #1 reads the write data element from the buffer #1, and transfers this data to the FM chip #1-1, and, in addition, at substantially the same time (parallelly), the DMA #2 reads the write data element from the buffer #2, and transfers this data to the FM chip #2-1 (Step 1307).

Next, the FM bus protocol control part 246 acquires the statuses of the commands from the FM chips #1-1 and #2-1, and stores these statuses in the control register 242. The CPU 21 refers to the control register 242, checks that the write ended normally (Step 1308), and in the case of normal ends, ends the processing.

According to this multi-write process, multiple data elements can be written substantially simultaneously (parallelly) to multiple FM chips 32, thereby making it possible to shorten the time required for write processing.

Furthermore, a wear leveling process for making the number of erases uniform can be performed with respect to both the chip write process and the chip multi-write process. The wear leveling process may be performed asynchronously to these write processes.

According to a wear leveling process performed asynchronously to a write process, for example, the FM controller 20 (for example, the CPU 21) at an arbitrary timing selects the block with the highest number of erases, and migrates valid data from valid pages inside this selected block to a block having the lowest number of erases. The migration-source block and the migration-destination block may be in the same FM chip 32, or may be in different FM chips 32. In the case of the latter, it is desirable that the different FM chips 32 share a CE signal line 27.

According to a wear leveling process, which is performed during a write process, the FM controller 20 selects a block having the fewest number of erases from the write-destination FM chip 32 as the write destination, and writes the data element to this block. Furthermore, in this process, for example, in the step when the CE signal line 27 is selected in FIG. 13 or 14, the FM controller 20 may select a CE signal line 27 having the fewest total number of erases, and from a FM chip 32 coupled to this CE signal line 27, may select a block in this FM chip 32 having the smallest number of erases. The storage area of the FM controller 20 (for example, the DRAM 11) may store erase management information 1901 illustrated in FIG. 19. This information 1901 denotes the number of block erases for each CE signal line 27 and each block. The total number of CE signal line 27 erases is the total of the number of erases of all the blocks of all the FM chips 32 that share this CE signal line 27. In a case where an erase process has been performed with respect to a block, the FM controller 20 may update the number of erases corresponding to this block and the total number of erases corresponding to the CE signal line 27 to which the FM chip 32 comprising this block is coupled. The number of erases of each block and the total number of erases for each CE signal line 27 can be identified from this information 1901.

Next, a reclamation process, that is, a process for creating a block that is able to undergo an erase process will be explained.

Figure 18:
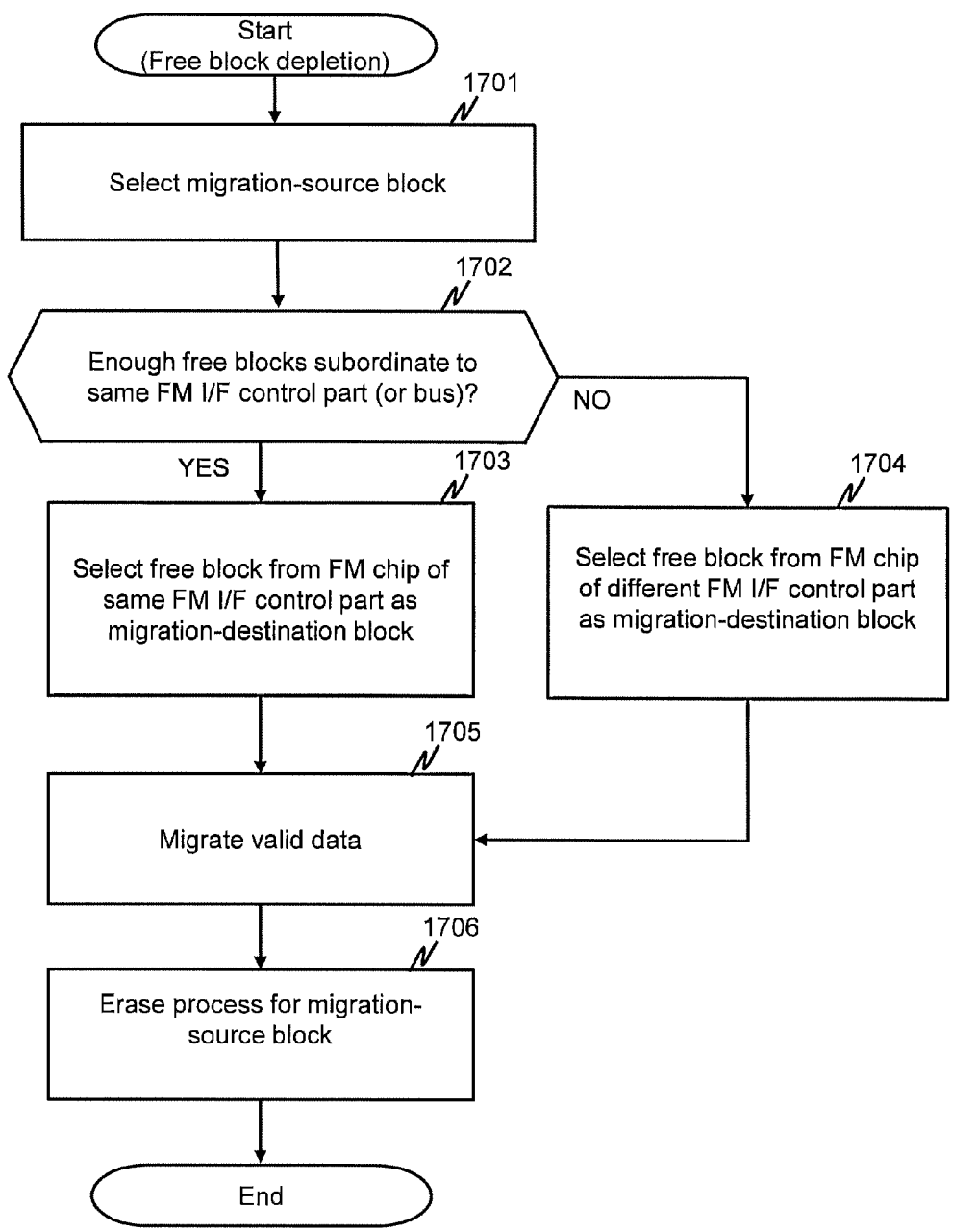
FIG. 18 shows an example of a flowchart of a reclamation process related to the embodiment.

FIG. 18 is an example of a flowchart of a reclamation process.

The reclamation process, for example, is executed by the FM controller 20 when the FM controller 20 detects a depletion of usable capacity in the FM chip 32. Capacity depletion signifies that the number of free blocks has become less than a prescribed percentage (prescribed number). The detection of capacity depletion may be done using an arbitrary unit, and may be done for each of multiple FMs on a certain DIMM. The reclamation process may be started when the fact that a free block has been depleted is detected in a write process, or may be performed asynchronously to a write process.

The FM controller 20 selects a migration-source block from a FM chip (hereinafter, "free depleted chip" in FIG. 18) 32, in which a free block has been depleted (Step 1701). It is desirable here that the migration-source block be the block with the fewest valid pages in the free depleted chip 32 (or a block in which data is written up to the end page in the free depleted chip 32 (an erase candidate block)). This is because such a block will have the smallest total amount of valid data to be migrated, thereby making it possible to reduce the load and time required for the reclamation process. Furthermore, the migration-source block may be selected from a FM chip 32 other than the free depleted chip 32.

The CPU 21 determines whether or not the free blocks in multiple FM chips 32, which are coupled to the same FM IF control part 24 (or bus 25 or SW 31) as the control part 24 (or bus 25 or SW 31) that is able to communicate data with the FM chip 32 comprising the migration-source block selected in Step 1701, is equal to or larger than a prescribed number (Step 1702). The "prescribed number" referred to here may be uniform or different for all the FM chips 32.

In a case where the result of the determination of Step 1702 is affirmative, the CPU 21 selects free blocks of multiple FM chips 32 coupled to the same control part 24 (or bus 25 or SW 31) as the migration-destination block (Step 1703). The free blocks of multiple FM chips 32 coupled to the same bus 25 or SW 31 may be preferentially selected as the migration-destination blocks. In a case where the prescribed number of free blocks does not exist in multiple FM chips 32 coupled to the same bus 25 or SW 31, the free blocks of multiple FM chips 32 coupled to a different bus 25 or SW 31 in the same control part 24 may be selected as the migration-destination blocks. This approach is believed to make it easier to maintain a stripe (two or more contiguous data elements of an address arranged in different FM chips 32 (FM chips 32 having different buses 25) of the same CE signal line 27). For example, in FIG. 5, when the data element #0, which was stored in FM #1-1, is stored in FM #3-1 in accordance with a reclamation process, the data element #0 and the data element #2 come to exist in the same FM. When a data element read/write occurs in this state, the read/write will take time due to the fact that the busy periods of the bus 25-3 and the FM #3-1 will overlap. Restricting the range of the reclamation maintains the stripe state of the data elements, making it possible to transfer data efficiently in a subsequent read/write process.

In a case where the result of the determination on Step 1703 is negative, the CPU 21 selects free blocks of multiple FM chips 32 coupled to different control parts 24 (or buses 25 or SWs 31) as the migration-destination block (Step 1704).

After either Step 1703 or Step 1704, that is, after the migration-source block and the migration-destination block have been decided, the CPU 21 migrates the valid data inside the migration-source block to the migration-destination block (Step 1705). That is, the CPU 21 reads the valid data from the migration-source block, writes this valid data to the DRAM 11, and writes this valid data from the DRAM 11 to the migration-destination block. At this time, the ECC circuit 241 performs an error correcting process. Furthermore, the CPU 21 may read the valid data from the migration-source block and write this valid data to the DRAM 11 prior to deciding the migration-destination block. Also, in a case where the DIMM 30 comprises an ECC circuit, an error correcting process is possible in the DIMM 30, thereby making it possible to transfer the data to the migration-destination block without storing the data of the migration-source block in the DRAM 11. Similarly, in a case where the FM 32 comprises an ECC circuit, an error correcting process is possible in the FM 32, thereby making it possible to transfer the data to the migration-destination block without storing the data of the migration-source block in the DRAM 11. Thus, in a case where either the DIMM 30 or the FM 32 has an ECC circuit, it is possible to lessen the processing load of the CPU 21 since the FM I/F control part 24 executes the data transfer.

When the valid data, which has been read from the migration-source block, is written to the migration-destination block, all the data inside the migration-source block becomes invalid data. The CPU 21 performs an erase process with respect to the migration-source block (Step 1706). In accordance with this, the migration-source block is managed as a free block, and transitions to a state in which it can once again be selected as a write destination. Furthermore, at the time of this erase process, the information 1900 illustrated in FIG. 19 may be updated. That is, the number of erases corresponding to the migration-source block and the total number of erases corresponding to the CE signal line 27 to which the FM chip 32 comprising the migration-source block is coupled may be updated.

The preceding is a reclamation process related to this embodiment.

Furthermore, in either Step 1703 or 1704, it is desirable that the free block with the fewest number of erases in the selected FM chip 32 be selected as the migration-destination block. This makes it possible to equalize the number of erases with a high degree of accuracy. Also, multiple blocks may be divided into multiple groups in accordance with the number of erases, and a block may be selected from the groups having the smallest number of erases. The time spent searching for a block is shortened in this case.

Also, in Step 1701, multiple blocks may be selected as migration-source blocks, and in Steps 1703 and 1704, multiple free blocks may be selected as migration-destination blocks. In this case, it is desirable that the multiple migration-source blocks be selected from multiple FM chips 32 sharing a common CE signal line 27, but may be selected from multiple FM chips 32 coupled to different CE signal lines 27. This is because the chip busy period is shorter for the chip read process than for the chip write process, that is, the impact of the performance is smaller. Alternatively, it is desirable that the multiple migration-destination blocks be selected from multiple FM chips 32 that share a common CE signal line 27. Then, at valid data migration (Step 1705), it is desirable that multiple pieces of valid data be parallelly written to multiple FM chips 32 sharing the CE signal line 27. Also, in a case where erasable blocks exist on the same CE 27 when executing the erase process in Step 1706, these blocks can be erased simultaneously (parallelly). Since an erase process generally takes time, executing an erase process collectively for multiple blocks is efficient.

Next, a refresh process related to this embodiment will be explained.

The refresh process may be performed regularly for a block comprising valid pages (for example, when 30 days has elapsed since the previous refresh process for this block), or may be performed for a block in which an ECC error at the time of a read is equal to or larger than a prescribed number of bits. The refresh process is executed by the FM controller 20.

In the refresh process, the FM controller 20 regards the block targeted for the refresh process as the migration-source block. Thereafter, (1) deciding the migration-destination block, (2) migrating the valid data from the migration-source block to the migration-destination block, and (3) an erase process for the migration-source block are performed. These (1) through (3) are the same as the above-described reclamation process.

An embodiment has been described hereinabove, but it goes without saying that the present invention is not limited to this embodiment, and that various changes can be made without departing from the gist thereof.

For example, in the embodiment described above, a NAND-type flash memory is employed as an example of a nonvolatile semiconductor storage medium, but the nonvolatile semiconductor storage medium is not limited thereto. For example, the storage medium may be a phase-change memory.

Also, in the embodiment described above, the memory module for mounting multiple FM chips 32 is a DIMM 30, but a memory module other than a DIMM may be used.

Furthermore, in the embodiment described above, multiple FM chips 32 in the same DIMM 30 are coupled to the same CE signal line 27, but multiple FM chips 32 of different DIMM 30 may be coupled to the same CE signal line 27.

Also, in the embodiment described above, multiple data elements can be parallelly written to multiple FM chips 32 in the flash memory device 400. That is, a large amount of data can be written per period of time. For this reason, the RAID controller 301 may execute control so as to make the amount of data inside the flash memory device 400 (or the data amount transfer unit in a data transfer between flash memory devices 400) larger than the data amount transfer unit in a data transfer involving a type of storage device other than the flash memory device 400 (for example, the SSD device 500, the HDD device (SAS) 600, or the HDD device (SATA) 700).

Figure 14:
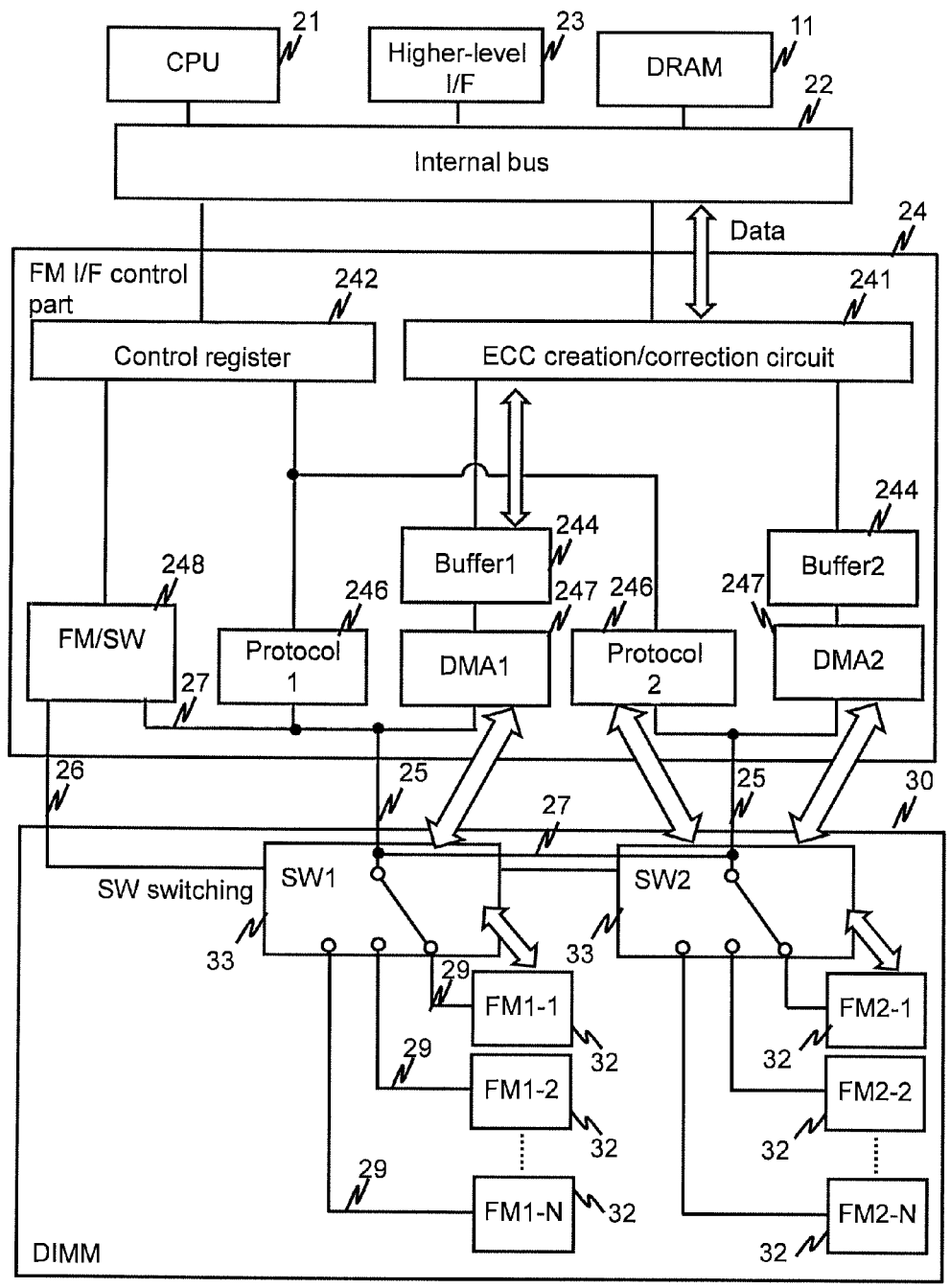
FIG. 14 shows an example of the detailed configuration of a portion of the flash memory package related to a variation of the embodiment.

Also, for example, the configuration of the flash memory PKG 10 may be the configuration shown in FIG. 14. The flash memory PKG shown in FIG. 14 is configured to also enable the CE signal line 27 to be switched using a SW 33. The CE signal line 27 is coupled to a FM/SW 248. The CE signal line 27 and the bus 25 are coupled to the SW #1. The CE signal line 27 is also coupled to the SW #2. The SW 33 (#1, #2) is coupled to multiple FM chips 32 using a bus 29 that comprises a CE signal line and a data bus. The SW 33 selectively couples one of multiple buses 29 to the bus 25 and the CE signal line 27 based on a switching signal supplied in accordance with the switching signal line 26. According to this configuration, it is possible to reduce the number of CE signal lines 27 for outputting in the FM I/F control part 24, and to reduce the size of the FM I/F control part 24 chip.

REFERENCE SIGNS LIST

1 Storage system
10 Flash memory PKG
400 Flash memory device

The invention claimed is:

1. A flash memory package comprising:
a flash memory controller;
a first data bus coupled to the flash memory controller;
a second data bus coupled to the flash memory controller;
multiple third data buses;
multiple fourth data buses;
multiple first flash memory chips, each of the multiple first flash memory chips coupled to one of the multiple third data buses;
multiple second flash memory chips, each of the multiple second flash memory chips coupled to one of the multiple fourth data buses;
a first switch coupled to the first data bus and selectively coupled to any one of the multiple third data buses;
a second switch coupled to the second data bus and selectively coupled to any one of the multiple fourth data buses; and
a switching signal line coupled to the flash memory controller and the first switch,
wherein the first switch is configured to be coupled directly to the second switch for sending a switching signal using the switching signal line, so that the flash memory controller accesses, substantially in parallel, the one of the multiple first flash memory chips and the one of the multiple second flash memory chips by supplying one switching signal to both the first switch and the second switch using the switching signal line.

2. The flash memory package according to claim 1, further comprising:
multiple chip enable signal lines coupled to the flash memory controller, each of which is coupled to the one of the multiple first flash memory chips and the one of the multiple second flash memory chips.

3. The flash memory package according to claim 2,
wherein the multiple chip enable signal lines comprise a first and a second chip enable signal line, and
wherein
(A) the flash memory controller is configured to send a chip enable signal using the first chip enable signal line, and to control the respective different switches such that a flash memory chip, which is the first or second flash memory chip, and which is configured to receive a chip enable signal using the first chip enable signal line, becomes a coupling destination;
(B) the flash memory controller is configured to send in parallel two or more contiguous data elements of the multiple data elements to two or more of the flash memory chips that share the first chip enable signal line;
(C) the flash memory controller is configured to switch the coupling destination of the switch coupled to the flash memory chip that has received the data element in (B) to a flash memory chip, which is to receive a chip enable signal using the second chip enable signal line;
(D) the flash memory controller is configured to send the chip enable signal using the second chip enable signal line; and
(E) the flash memory controller is configured to send in parallel two or more contiguous data elements of the remaining multiple data elements to two or more of the flash memory chips that share the second chip enable signal line.

4. The flash memory package according to claim 3, wherein
the flash memory controller is configured to manage a total number of erase processes performed for a block for each of the chip enable signal lines,
the flash memory chip selected as the transfer destination of multiple data elements belonging to the multiple flash memory chips that share the chip enable signal for which the fewest number of the erase processes are performed, and
the block that constitutes a data element write destination in the flash memory chip is the block for which the fewest number of erases are performed.

5. The flash memory package according to claim 4, wherein
each of the flash memory chips comprises multiple blocks,
the flash memory controller is configured to perform a reclamation process, and
in the reclamation process, the flash memory controller is configured to:
(r1) select a migration-source block from the multiple blocks;
(r2) decide on a migration-destination block from the multiple blocks;
(r3) migrate valid data in a page of the migration-source block to the migration-destination block; and
(r4) perform an erase process for erasing data from the migration-source block, and wherein in (r2), the migration-destination block is decided from the flash memory chips capable of communicating data with a media interface, which is able to communicate data with the flash memory chip having the migration-source block.

6. The flash memory package according to claim 5, wherein two or more of the switches, each of which is either the first switch or the second switch, are coupled to the media interface in the flash memory controller using two or more data buses each of which is either the first data bus or the second data bus, and the migration-source block and the migration-destination block exist in one or more of the flash memory chips capable of communicating data using the same data bus.

7. The flash memory package according to claim 6, wherein in (r2), the flash memory controller is configured to determine whether or not the number of free blocks that exist in one or more of the flash memory chips, which are capable of communicating data using the same data bus as the data bus for communicating data with the flash memory chip having the migration-source block, is equal to or larger than a prescribed number, and in a case where the result of this determination is affirmative, to decide on any free block as the migration-destination block from these one or more of the flash memory chips; and in a case where the result of this determination is negative, to decide on a free block as the migration-destination block from two or more of the flash memory chips, which are able to communicate data with the media interface that differs from the media interface that is able to communicate data with the flash memory chip comprising the migration-source block.

8. The flash memory package according to claim 1, wherein the flash memory controller is configured to control the first switch for coupling the first data bus to one of the multiple third data buses and to control the second switch for coupling the second data bus to one of the multiple fourth data buses.

9. The flash memory package according to claim 1, wherein the flash memory controller is configured to:

divide write data in to multiple data elements;

send, substantially in parallel, a first data element of the multiple data elements to the one of the multiple first flash memory chips and a second data element of the multiple data elements to the one of the multiple second flash memory chips, respectively.

* * * * *